(12) United States Patent
Suzuki

(10) Patent No.: US 8,901,847 B2
(45) Date of Patent: Dec. 2, 2014

(54) DRIVING DEVICE, LIGHT-EMITTING DEVICE AND PROJECTOR

(71) Applicant: Casio Computer Co., Ltd., Tokyo (JP)

(72) Inventor: Hideo Suzuki, Ome (JP)

(73) Assignee: Casio Computer Co., Ltd., Tokyo (JP)

(*) Notice: Subject to any disclaimer, the term of this patent is extended or adjusted under 35 U.S.C. 154(b) by 0 days.

(21) Appl. No.: 14/029,184

(22) Filed: Sep. 17, 2013

(65) Prior Publication Data

US 2014/0077714 A1    Mar. 20, 2014

(30) Foreign Application Priority Data

Sep. 20, 2012  (JP) .................... 2012-206839
Mar. 22, 2013  (JP) .................... 2013-060176

(51) Int. Cl.
*H05B 37/02*  (2006.01)
*G03B 21/14*  (2006.01)
*H02M 3/155*  (2006.01)

(52) U.S. Cl.
CPC ............ *H05B 37/0281* (2013.01); *H05B 37/02* (2013.01); *G03B 21/14* (2013.01); *H02M 3/155* (2013.01); *Y02B 20/42* (2013.01)
USPC .......................................... 315/291; 315/308

(58) Field of Classification Search
USPC ............ 315/209 R, 224–226, 291, 307, 308, 315/312, 320
See application file for complete search history.

(56) References Cited

U.S. PATENT DOCUMENTS 6,577,072 B2    6/2003  Saito et al.
2008/0136350 A1*  6/2008  Tripathi et al. ............... 315/294

FOREIGN PATENT DOCUMENTS

JP    2009-200053 A    9/2009

* cited by examiner

*Primary Examiner* — Jimmy Vu
(74) *Attorney, Agent, or Firm* — Holtz, Holtz, Goodman & Chick PC

(57) ABSTRACT

A driving device includes a switching power supply circuit to convert input power to output power; a first switching element which opens and closes a circuit of a load; an output capacitor connected in parallel to the load and the first switching element; a selection switch disposed between the inductor and the output capacitor, the selection switch switching between a first selection state where the load is electrically connected to the inductor and the second selection state where a reference potential portion is electrically connected to the inductor; a timing controller which operates the switching power supply circuit while the first switching element is closed; and a controller which puts the selection switch into the second selection state before the first switching element is closed.

18 Claims, 13 Drawing Sheets

DRIVING DEVICE, LIGHT-EMITTING DEVICE AND PROJECTOR

BACKGROUND OF THE INVENTION

1. Field of the Invention

The present invention relates to a driving device, a light-emitting device and a projector.

2. Description of Related Art

Japanese Patent Application Laid-Open No. 2009-200053, for example, discloses a driving device which drives a semiconductor light-emitting element to flash. This driving device uses a switching power supply circuit as a constant-current power supply to supply power to the semiconductor light-emitting element (see FIG. 6 of Japanese Patent Application Laid-Open No. 2009-200053, for example). Alternate operating and stopping of the switching power supply circuit causes the semiconductor light-emitting element to flash.

In order to achieve rapid flashing of a semiconductor light-emitting element, a quick response to the change in current applied to the semiconductor light-emitting element is required. The technique of Japanese Patent Application Laid-Open No. 2009-200053, however, focuses on efficient use of power and reduction in power loss and does not intend to improve rise characteristics of current.

SUMMARY OF THE INVENTION

An object of the present invention is to achieve rapid rise characteristics of a drive current flowing through a load, such as a semiconductor light-emitting element, driven by a driving device.

In order to achieve the above-mentioned object, according to a first aspect of the present invention, there is provided a driving device including: a switching power supply circuit including an inductor, the switching power supply circuit repeatedly turning on and off an input current flowing through the inductor to repeatedly accumulate and release energy in and from the inductor so as to convert input power to output power; a first switching element connected to a load, the first switching element opening and closing a circuit of the load; an output capacitor connected in parallel to the load and the first switching element; a selection switch disposed between the inductor and the output capacitor, the selection switch switching between a first selection state and a second selection state, the first selection state being a state where the load is electrically connected to the inductor and where a reference potential portion is electrically disconnected from the inductor, and the second selection state being a state where the load is electrically disconnected from the inductor and where the reference potential portion is electrically connected to the inductor; a timing controller which alternately opens and closes the first switching element and alternately operates the switching power supply circuit by repeatedly turning on and off the input current flowing through the inductor and stops operating the switching power supply circuit, the timing controller operating the switching power supply circuit while the first switching element is closed; and a controller which alternately switches the selection switch between the first selection state and the second selection state, wherein the controller puts the selection switch into the second selection state before the timing controller closes the first switching element.

According to a second aspect of the present invention, there is provided a light-emitting device including the driving device according to the first aspect; and a light-emitting element as the load.

According to a third aspect of the present invention, there is provided a projector including the light-emitting device according to the second aspect.

According to a fourth aspect of the present invention, there is provided a driving device including: a first switching element connected to a load, the first switching element opening and closing a circuit of the load; an output capacitor connected in parallel to the load and the first switching element; a boost switching power supply circuit including an inductor connected to an input, a rectifier element having an anode connected to the inductor and a cathode connected to the output capacitor, and a second switching element disposed between the inductor and a reference potential portion, the boost switching power supply circuit repeatedly turning on and off the second switching element to repeatedly turn on and off an input current flowing through the inductor and to repeatedly accumulate and release energy in and from the inductor so as to convert input power to output power; a timing controller which alternately opens and closes the first switching element and alternately operates the boost switching power supply circuit by repeatedly turning on and off the second switching element and stops operating the boost switching power supply circuit, the timing controller operating the boost switching power supply circuit while the first switching element is closed; and a controller which alternately turns on and off the second switching element, wherein the boost switching power supply circuit repeatedly turns on and off the second switching element in preference to the turning off of the second switching element by the controller while the controller controls the second switching element to be off; and the controller turns on the second switching element before the timing controller closes the first switching element.

According to a fifth aspect of the present invention, there is provided a light-emitting device including the driving device according to the fourth aspect; and a light-emitting element as the load.

According to a sixth aspect of the present invention, there is provided a projector including the light-emitting device according to the fifth aspect.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Figure 1:
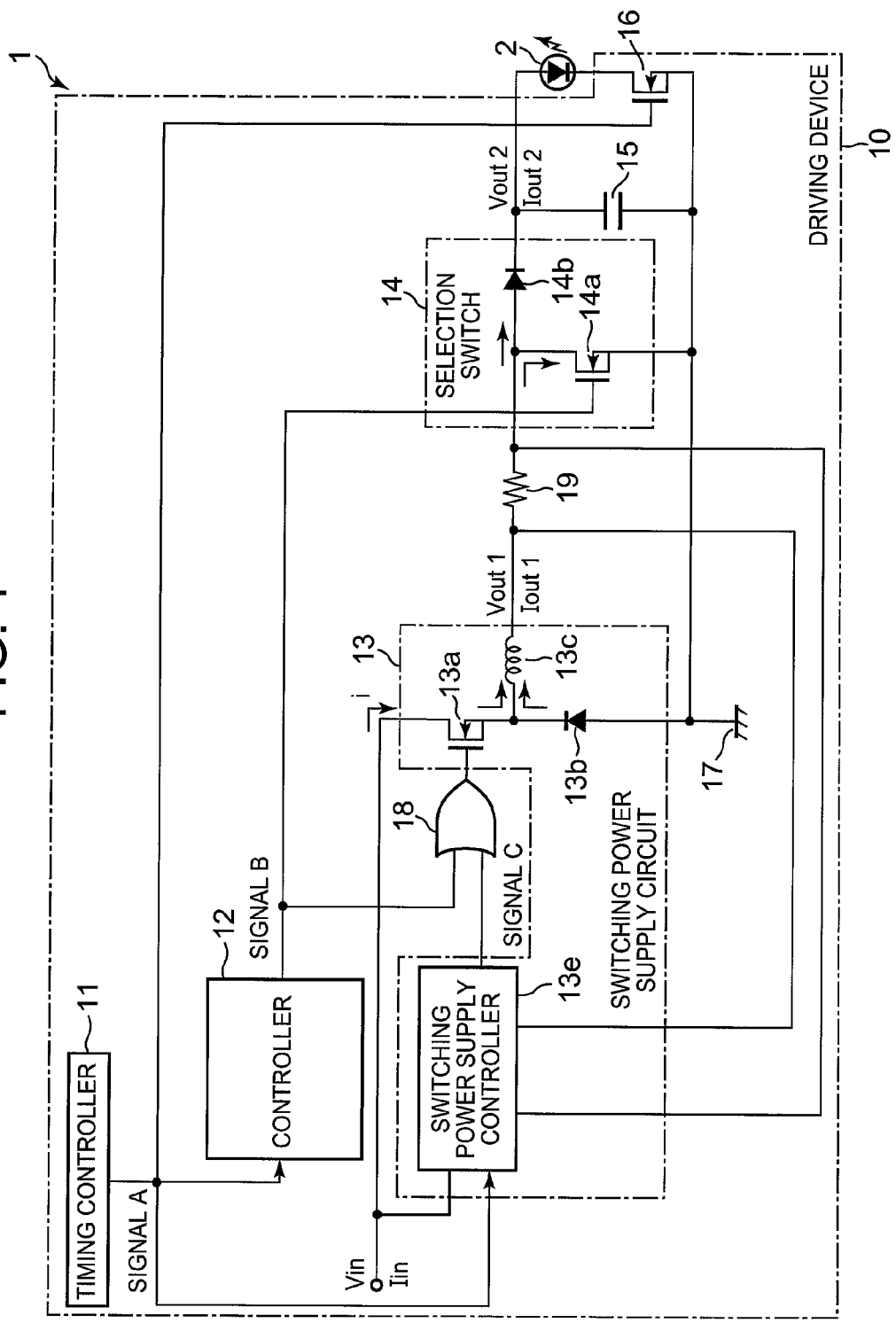
FIG. 1 is a circuit diagram of a light-emitting device in a first embodiment of the present invention.

Embodiments of the present invention are described below with reference to the attached drawings. The embodiments described below include various limitations which are technically preferable to carry out the present invention. The technical scope of the present invention, however, is not limited to the embodiments described below and the examples shown in the drawings.

First Embodiment

Figure 2:
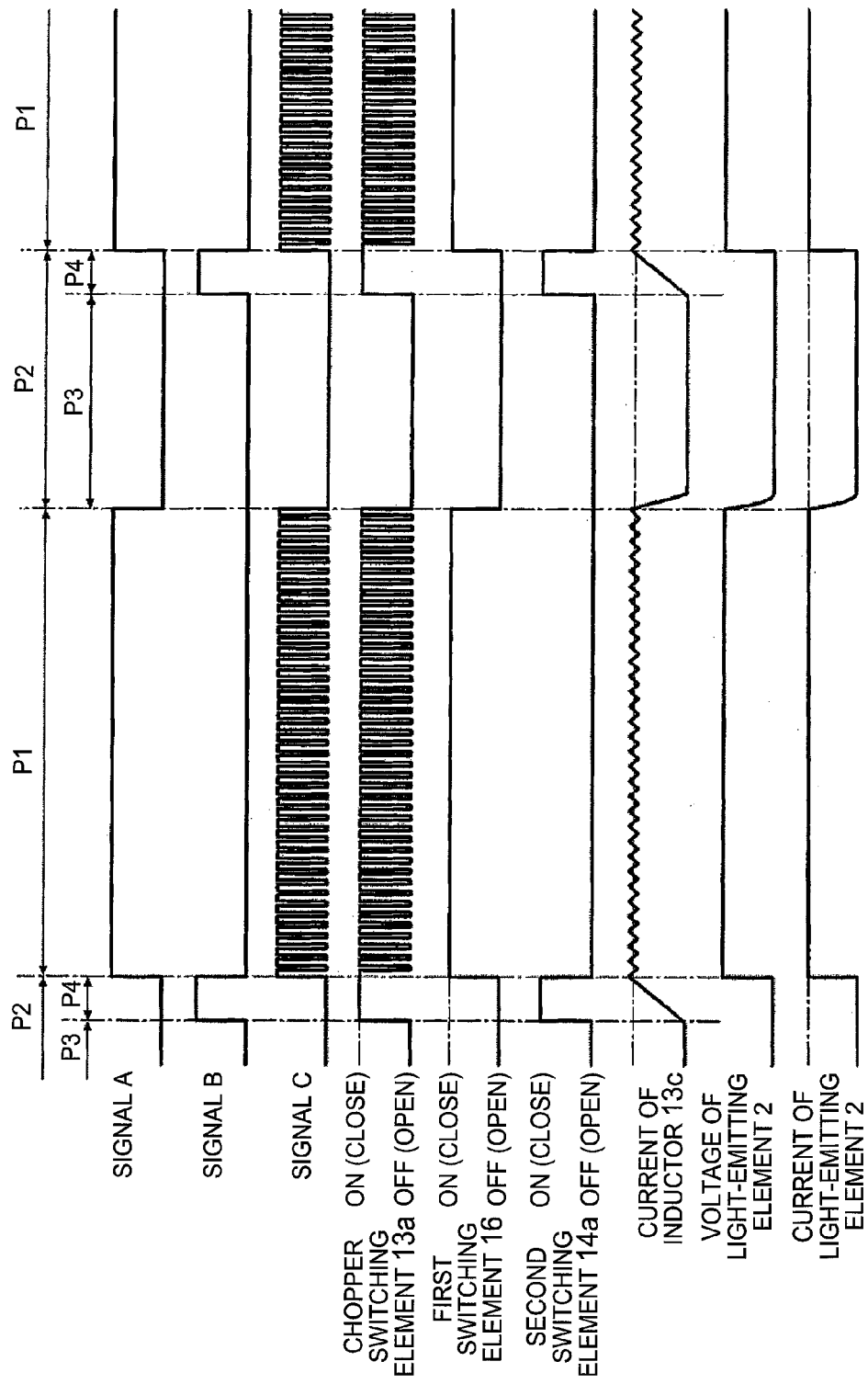
FIG. 2 is a timing chart showing the signal waveform of each element of the light-emitting device in the first embodiment.

FIG. 1 is a circuit diagram of a light-emitting device 1. FIG. 2 is a timing chart showing the signal of each element of the light-emitting device 1.

The light-emitting device 1 intermittently emits light. That is, the light-emitting device 1 is a flasher device.

The light-emitting device 1 includes a light-emitting element 2 and a driving device (driving circuit) 10.

The light-emitting element 2 is a light-emitting diode, an organic EL element, a semiconductor laser or another semiconductor light-emitting element.

The driving device 10 intermittently drives the light-emitting element 2. Specifically, the driving device 10 drives the light-emitting element 2 to flash rapidly. The light-emitting element 2 has such a short flashing cycle that the flashing cannot be recognized by the naked eye. The voltage Vout2 and the current Iout2 in FIG. 1 are an output voltage and an output current, respectively, of the driving device 10. Applying the voltage Vout2 and the current Iout2 to the light-emitting element 2 drives the light-emitting element 2.

The driving device 10 includes a timing controller 11, a controller 12, a switching power supply circuit 13, a selection switch 14, an output capacitor 15, a first switching element 16 and a resistor 19, for example.

The output of the switching power supply circuit 13 is connected to the selection switch 14 through the resistor 19. The resistor 19 and the selection switch 14 are disposed between the output of the switching power supply circuit 13 and the light-emitting element 2. The light-emitting element 2 and the first switching element 16 are connected in series, and the light-emitting element 2 is connected to a ground 17 through the first switching element 16. The output capacitor 15 is connected in parallel with the series-connected light-emitting element 2 and the first switching element 16. The ground 17 is a reference potential portion.

<Switching Power Supply Circuit 13 and Resistor 19>

The switching power supply circuit 13 converts input power to output power. Specifically, the switching power supply circuit 13 is a DC-DC converter which converts a direct-current input voltage Vin and input current Iin to a direct-current output voltage Vout1 and output current Iout1, respectively.

The switching power supply circuit 13 is a constant-current power supply circuit. That is, the switching power supply circuit 13 controls the output current Iout1 to remain constant regardless of the output voltage Vout1. The switching power supply circuit 13 preferably feeds back the output current Iout1, based on which the output current Iout1 is controlled to remain constant.

The switching power supply circuit 13 is a switching regulator such as a boost switching regulator, a buck switching regulator, a buck-boost switching regulator, an insulated switching regulator or a non-insulated switching regulator. Specifically, the switching power supply circuit 13 includes a chopper switching element 13a and an inductor 13c. Alternately turning on and off the chopper switching element 13a causes alternate turning on and off (i.e., chopping) of the input current i flowing through the inductor 13c, and thereby converts the input voltage Vin and the input current Iin to the output voltage Vout1 and the output current Iout1, respectively.

Here, a case where the switching power supply circuit 13 is a buck switching regulator, a preferable type, is described as a concrete example. The switching power supply circuit 13 further includes a flywheel diode 13b and a switching power supply controller 13e in addition to the chopper switching element 13a (i.e., a switching element for a PWM control) and the inductor 13c.

The chopper switching element 13a is an N-channel field-effect transistor. The drain of the chopper switching element 13a is connected to the input of the switching power supply circuit 13. The drain is further connected to the direct-current power supply of the input voltage Vin and the input current Iin. The source of the chopper switching element 13a is connected to the cathode of the flywheel diode 13b. The anode of the flywheel diode 13b is connected to the ground 17.

The source of the chopper switching element 13a and the cathode of the flywheel diode 13b are connected to one end of the inductor 13c, and the other end of the inductor 13c is connected to one end of the resistor 19. The other end of the inductor 13c is the output of the switching power supply circuit 13.

The resistor 19 is used to detect the output current Iout1 of the switching power supply circuit 13. Specifically, the output current Iout1 is converted to the voltage of the resistor 19, and a signal representing the output current Iout1 (i.e., the voltage of the resistor 19) is inputted to the switching power supply controller 13e. Since the resistor 19 and the inductor 13c are connected in series, the output current Iout1 detected with the resistor 19 is equal to the current of the inductor 13c. Alternatively, the resistor 19 may be disposed between the cathode of a later-described rectifier element 14b and the light-emitting element 2 and between the output capacitor 15 and the light-emitting element 2, and a signal representing the current Iout2 (i.e., the voltage of the resistor 19) may be inputted to the switching power supply controller 13e. In this case, the inductor 13c is directly connected to the anode of the rectifier element 14b and the drain of a later-described second switching element 14a.

The gate of the chopper switching element 13a is connected to the output of an OR gate 18, and a first input of the OR gate 18 is connected to the switching power supply controller 13e. The switching power supply controller 13e outputs a signal C. When a second input of the OR gate 18 (timing signal B), which is described later, is at a low level, the signal C is inputted to the gate of the chopper switching element 13a through the OR gate 18. Accordingly, the chopper switching element 13a is turned on and off on the basis of the signal C outputted from the switching power supply controller 13e to turn on and off (chop) the current i from the input of the switching power supply circuit 13. When the chopper switching element 13a is in an on-state, a current flows from the input of the switching power supply circuit 13 through the chopper switching element 13a and the inductor 13c to the output of the switching power supply circuit 13. This current causes energy to be accumulated in the inductor 13c. When the chopper switching element 13a is put into an off-state thereafter, the inductor 13c generates induced electromotive force which causes a current to flow through the flywheel diode 13b. This generates a current flowing from the ground 17 through the flywheel diode 13b and the inductor 13c to the output, which results in release of the energy stored in the inductor 13c. Thus, the input voltage Vin and the input current Iin are converted to the output voltage Vout1 and output current Iout1, respectively. Further, the inductor 13c smoothes the output current Iout1 even when the current i is turned on and off by the chopper switching element 13a.

The switching power supply controller 13e is a PWM (pulse width modulation) controller, and the signal C is a PWM signal. Specifically, the switching power supply controller 13e sequentially changes a duty cycle (duty ratio) on the basis of the output current Iout1 detected with the resistor 19 (i.e., the voltage of the resistor 19) and a predetermined target value (hereinafter referred to as a constant-current target value). The switching power supply controller 13e generates the PWM signal C having the duty cycle to output it to the gate of the chopper switching element 13a through the OR gate 18. In this way, the switching power supply controller 13e performs a constant-current control where the output current Iout1 is approximated to the constant-current target value and maintained at it.

[Selection Switch 14]

The selection switch 14 is disposed between the switching power supply circuit 13 including the inductor 13c and the output capacitor 15.

The selection switch 14 switches between a first selection state where the second switching element 14a is off and a second selection state where the second switching element 14a on. When the selection switch 14 is in the first selection state, the selection switch 14 electrically connects the light-emitting element 2 and the output capacitor 15 to the inductor 13c (i.e., the output of the switching power supply circuit 13) through the later-described rectifier element 14b in the selection switch 14, and electrically disconnects the ground 17 from the inductor 13c. When the selection switch 14 is in the second selection state, the selection switch 14 electrically disconnects the light-emitting element 2 and the output capacitor 15 from the inductor 13c due to the rectifying action of the rectifier element 14b, and electrically connects the inductor 13c to the ground 17.

A preferable configuration of the selection switch 14 is described in detail below.

The selection switch 14 includes the second switching element 14a and the rectifier element (or backflow prevention diode) 14b. The second switching element 14a is an N-channel field-effect transistor. The second switching element 14a has a drain connected to the inductor 13c through the resistor 19, a source connected to the ground 17 and a gate connected to the controller 12. The anode of the rectifier element 14b is connected to the drain of the second switching element 14a. The anode of the rectifier element 14b is connected to the inductor 13c through the resistor 19. The cathode of the rectifier element 14b is connected to the anode of the light-emitting element 2.

The second switching element 14a is turned on and off in response to the timing signal B from the controller 12. When the second switching element 14a is off, the selection switch 14 is in the first selection state. Specifically, when the second switching element 14a is off, the anode of the rectifier element 14b is electrically disconnected from the ground 17, which causes a current to flow to the light-emitting element 2 through the rectifier element 14b. In contrast, when the second switching element 14a is on, the selection switch 14 is in the second selection state. Specifically, when the second switching element 14a is on, the anode of the rectifier element 14b is electrically connected to the ground 17, which prevents the current of the switching power supply circuit 13 from flowing to the output capacitor 15 and the light-emitting element 2 due to the rectifying action of the rectifier element 14b.

[Output Capacitor 15 and First Switching Element 16]

One electrode of the output capacitor 15 is connected to the cathode of the rectifier element 14b and the anode of the light-emitting element 2, and the other electrode of the output capacitor 15 is connected to the ground 17. When the selection switch 14 electrically connects the inductor 13c to the anode of the light-emitting element 2, the output voltage Vout1 of the switching power supply circuit 13 and the voltage Vout2 of the light-emitting element 2 are smoothed through charging/discharging of the output capacitor 15 caused by the on-off switching of the chopper switching element 13a.

When the selection switch 14 is in the second selection state, as described above, and the first switching element 16 is off; an electric charge confined due to the rectifying action of the rectifier element 14b and interrupting action of the first switching element 16 is accumulated in the output capacitor 15. This allows the output capacitor 15 to hold the voltage immediately before the first switching element 16 is turned off.

The first switching element 16 is an N-channel field-effect transistor. The first switching element 16 has a drain connected to the cathode of the light-emitting element 2, a source connected to the ground 17 and a gate connected to the timing controller 11. The first switching element 16 opens and closes the circuit of the light-emitting element 2. Specifically, the on-state first switching element 16 closes the circuit of the light-emitting element 2 to be in a conduction state, and the off-state first switching element 16 opens the circuit of the light-emitting element 2 to be in an interruption state.

[Timing Controller 11]

The timing controller 11 generates a timing signal A having a constant cycle, for example, and outputs the timing signal A to the switching power supply circuit 13, in particular, to the switching power supply controller 13e. The timing controller 11 alternately operates (enables) and stops operating (disables) the switching power supply circuit 13 and the switching power supply controller 13e with the timing signal A. The period during which the timing signal A is at a high level is hereinafter referred to as a period P1, and the period during which the timing signal A is at a low level is referred to as a period P2.

During the period P1, the switching power supply circuit 13 and the switching power supply controller 13e are operated, and the switching power supply controller 13e oscillates an output signal C. Accordingly, the chopper switching element 13a is turned on and off to convert the input voltage Vin and the input current Iin to the output voltage Vout1 and the output current Iout1, respectively, when the second input (i.e., a timing signal B) of the OR gate 18, described later, is at a low level. During the period P2, on the other hand, the switching power supply circuit 13 and the switching power supply controller 13e are stopped, and the output signal C from the switching power supply controller 13e remains constant at a low level without oscillating. Accordingly, the chopper switching element 13a remains in the off-state.

The timing controller 11 alternately opens and closes the first switching element 16. Specifically, the timing controller 11 outputs the timing signal A to the gate of the first switching element 16 to turn on and off the first switching element 16. The first switching element 16 closes the circuit of the light-emitting element 2 at the time when the switching power supply circuit 13 and the switching power supply controller 13e operate. The first switching element 16 opens the circuit of the light-emitting element 2 at the time when the switching power supply circuit 13 and the switching power supply controller 13e are stopped.

The timing controller 11 is a flashing timing controller, and the timing signal A is a flashing control signal, for example. The timing controller 11 controls the pulse width of the timing signal A (i.e., the length of period P1) to control the on-time duty cycle (on-time duty ratio) of the first switching element. The timing signal A has a longer cycle than the signal C, and the signal C oscillates more rapidly than the timing signal A.

[Controller 12 and OR Gate 18]

The controller 12 outputs the timing signal B to the gate of the second switching element 14a. The controller 12 is a microcomputer including an internally-stored program which makes the controller 12 carry out the function of generating the timing signal B, for example.

The timing signal B is a periodic pulse signal. When the timing signal B is at a low level, the second switching element 14a is off and the selection switch 14 is in the first selection state, namely, in the state where the light-emitting element 2 is electrically connected to the inductor 13c. When the timing signal B is at a high level, the second switching element 14a is on and the selection switch 14 is in the second selection state, namely, in the state where the light-emitting element 2 is electrically disconnected from the inductor 13c. The period during which the timing signal B is at a high level is hereinafter referred to as a period P4.

The timing signal B outputted from the controller 12 is also inputted to the second input of the OR gate 18. The OR gate 18 outputs a signal representing the logical sum of the signal C and the timing signal B to the gate of the chopper switching element 13a. Therefore, when the timing signal B inputted to the OR gate 18 is at a high level, the controller 12 forces the chopper switching element 13a to be in an on-state independently of the timing controller 11 and the switching power supply controller 13e. Specifically, the controller 12 controls the chopper switching element 13a to be in an on-state while the selection switch 14 is in the second selection state, and performs on-off control of the chopper switching element 13a on the basis of the signal C while the selection switch 14 is in the first selection state.

The timing signal A outputted from the timing controller 11 is also inputted to the controller 12 which then generates the timing signal B on the basis of the timing signal A. The timing signal B has the same cycle as the timing signal A, and the period P4 during which the timing signal B is at a high level is shorter than the period P2 during which the timing signal A is at a low level.

Upon detecting the rise of the timing signal A, the controller 12 makes the timing signal B fall. Therefore, the timing signal B falls at the time when the timing signal A rises so that the selection switch 14 is put into the first selection state and that the on/off state of the chopper switching element 13a is controlled on the basis of the signal C.

After a lapse of a predetermined period from the moment the controller 12 detects the rise of the timing signal A, the controller 12 makes the timing signal B rise. The predetermined period is the difference between the cycle of the timing signal A and the period P4. Therefore, the timing signal B rises after the falling of the timing signal A and before the rising of the timing signal A so that the selection switch 14 is put into the second selection state and that the chopper switching element 13a is turned on. The period from the falling of the timing signal A to the rising of the timing signal B is hereinafter referred to as a period P3. The end of the period P3 coincides with the start of the period P4.

Here, the length of the period P4 is a constant (value) and is programmed in advance into the controller 12. Specifically, the length of the period P4 is determined through experiment and design calculation in advance in view of the circuit characteristics of the switching power supply circuit 13, for example. For example, the length of the period P4 is a value obtained by dividing the product of the constant-current target value and the inductance of the inductor 13c by the input voltage Vin, or a corrected value based on the obtained value. The input voltage Vin is determined in advance through experiment and design calculation, for example. The constant-current target value is a target value of the output current Iout1 in the constant-current control performed by the switching power supply controller 13e. There may be a plurality of constants, i.e., the lengths of the period P4, stored in advance in the controller 12. In such a case, the controller 12 may select one of the constants on the basis of various conditions. This can change a constant flexibly according to various conditions.

[Behavior of Light-Emitting Device 1 and Current/Voltage of Each Element]

Upon rising of the timing signal A by the timing controller 11 at the start of the period P1, the first switching element 16 closes the circuit of the light-emitting element 2 to start operating the switching power supply circuit 13 and its switching power supply controller 13e. Further, the controller 12 makes the timing signal B fall at the time when the timing signal A rises.

The switching power supply controller 13e performs the PWM control to oscillate the signal C through the period P1 during which the timing signal A is at a high level. At this time, since the timing signal B inputted to the OR gate 18 is at a low level, the signal C outputted from the switching power supply controller 13e is inputted to the chopper switching element 13a through the OR gate 18. The signal C causes the chopper switching element 13a to repeatedly turn on and off the current i flowing from the input to the inductor 13c, which repeatedly accumulates and releases energy in and from the inductor 13c. Thus, the input voltage Vin and the input current Iin are converted to the output voltage Vout1 and the output current Iout1, respectively. The output current Iout1 of the switching power supply circuit 13 is maintained at the fixed constant-current target value under the feedback control and the PWM control by the switching power supply controller 13e if a ripple component is disregarded.

The timing signal B is at a low level through the period P1. Therefore, the second switching element 14a is off, the selection switch 14 is in the first selection state, and the output of the switching power supply circuit 13 is electrically connected to the anode of the light-emitting element 2. Through the period P1, the timing signal A is at a high level and the circuit of the light-emitting element 2 is closed by the first switching element 16. This causes the current Iout2 to flow through the light-emitting element 2 to turn on the light-emitting element 2. The light-emitting element 2 has substantially constant current Iout2, so emission intensity becomes substantially constant.

At the end of the period P1, the timing controller 11 makes the timing signal A fall so that the first switching element 16 is turned off. At this time, the first switching element 16 opens the circuit of the light-emitting element 2, which immediately makes the current of the light-emitting element 2 fall and immediately turns off the light-emitting element 2.

The switching power supply controller 13e stops operating and the oscillation of the output signal C from the switching power supply controller 13e stops at the time when the first switching element 16 is switched from on to off, namely, at the time when the timing signal A falls. Since the timing signal B is also at a low level at this time, the repeated turning on and off of the chopper switching element 13a ends and the chopper switching element 13a is turned off. Thus, the switching power supply circuit 13 stops operating and the current of the inductor 13c falls. At this time, the off-state of the first switching element 16 and the rectifying action of the rectifier element 14b retain the electric charges of the output capacitor 15 and the parasitic capacitor in the wiring between the rectifier element 14b and the light-emitting element 2.

The electric charge retained by the first switching element 16, for example, allows the voltage Vout2 to be held almost without dropping through the period P3 from the falling of the timing signal A to the rising of the timing signal B. The voltage Vout2 is to be applied to the light-emitting element 2 when the first switching element 16 is on. Through the period P3, a current does not flow through the light-emitting element 2, and therefore, the light-emitting element 2 is off.

After a lapse of a predetermined period (i.e., the difference between the cycle of the timing signal A and the period P4) from the rising of the timing signal A, the period P3 ends. At the end of the period P3, the controller 12 makes the timing signal B rise. This switches the second switching element 14a from off to on and switches the selection switch 14 from the first selection state to the second selection state. As a result, the anode of the light-emitting element 2 is electrically disconnected from the output of the switching power supply circuit 13 due to the rectifying action of the rectifier element 14b. Further, the chopper switching element 13a is switched from off to on. Therefore, a current flows from the input of the switching power supply circuit 13 to the ground 17 through the chopper switching element 13a, the inductor 13c, the resistor 19 and the second switching element 14a.

Through the period P4 during which the timing signal B is at a high level, the current of the inductor 13c increases and energy is accumulated in the inductor 13c. Since the length of the period P4 is determined through experiment and design calculation in advance in view of the circuit characteristics of the switching power supply circuit 13, for example, the current of the inductor 13c at the end of the period P4 becomes substantially the same as the constant-current target value. During the period P4, the rectifier element 14b of the selection switch 14 electrically disconnects the anode of the light-emitting element 2 from the output of the switching power supply circuit 13, and the first switching element 16 is opened namely, in an off-state. The electric charge retained by the output capacitor 15, for example, allows the voltage Vout2 to be held. The voltage Vout2 is to be applied to the light-emitting element 2 when the first switching element 16 is on. Through the period P4, a current does not flow through the light-emitting element 2, and therefore, the light-emitting element 2 is off.

After a lapse of the period P4 from the rising of the timing signal B, the period P1 starts. The timing controller 11 makes the timing signal A rise at the start of the period P1. The controller 12 makes the timing signal B fall at the time when the timing signal A rises. This starts the repeated turning on and off of the chopper switching element 13a, starts operating the switching power supply circuit 13, switches the second switching element 14a from on to off and switches the selection switch 14 from the second selection state to the first selection state. Further, the first switching element 16 is switched from off to on.

Since the voltage Vout2 to be applied to the light-emitting element 2 when the first switching element 16 is on is held through the periods P3 and P4, the voltage Vout2 of the light-emitting element 2 is put into a steady state as soon as or immediately after the switching power supply circuit 13 starts operating. Further, since the current of the inductor 13c increases during the period P4, the output current Iout1 of the switching power supply circuit 13, namely, the current Iout2 of the light-emitting element 2 reaches the fixed constant-current target value as soon as or immediately after the switching power supply circuit 13 starts operating. That is, reduction in current change due to the inductive effect of the inductor 13c does not occur at the time when the switching power supply circuit 13 starts operating. Therefore, the light-emitting element 2 emits light at an intended intensity as soon as or immediately after the switching power supply circuit 13 starts operating.

Therefore, according to the present embodiment, since the current Iout2 of the light-emitting element 2 rapidly rises at the start of the period P1, the light-emitting element 2 can be turned on more rapidly.

Further, according to the present embodiment, the use of the rectifier element 14b (i.e., a diode) enables rapid switching with a simple configuration.

Further, according to the present embodiment, since the first switching element 16 opens the circuit of the light-emitting element 2 at the time when the switching power supply circuit 13 stops operating, the power for operating the switching power supply circuit 13 can be saved.

Further, according to the present embodiment, the use of the OR gate 18 allows the chopper switching element 13a, which is used for the PWM control during the period P1, to remain in an on-state through the period P4.

According to the present embodiment, the chopper switching element 13a of the switching power supply circuit 13 is on through the period P4 to form a current pathway from the input to the inductor 13c. According to the present embodiment, therefore, providing another switching element is not necessary for the formation of the current pathway from the input to the inductor 13c. This prevents an increase in cost of the driving device 10 and prevents the driving device 10 from getting complicated.

Second Embodiment

The corresponding parts between a second embodiment and the first embodiment are identical except the following descriptions. The differences between the second embodiment and the first embodiment are described below. The same referential marks are assigned to the corresponding parts between the second embodiment and the first embodiment.

In the above-described first embodiment, the length of the period P4 during which the timing signal B is at a high level (see FIG. 2) is a constant and is programmed in advance into the controller 12. In contrast, in the second embodiment, the length of a period P4 is a variable and is determined on the basis of an input voltage Vin and the current of an inductor 13c.

Figure 3:
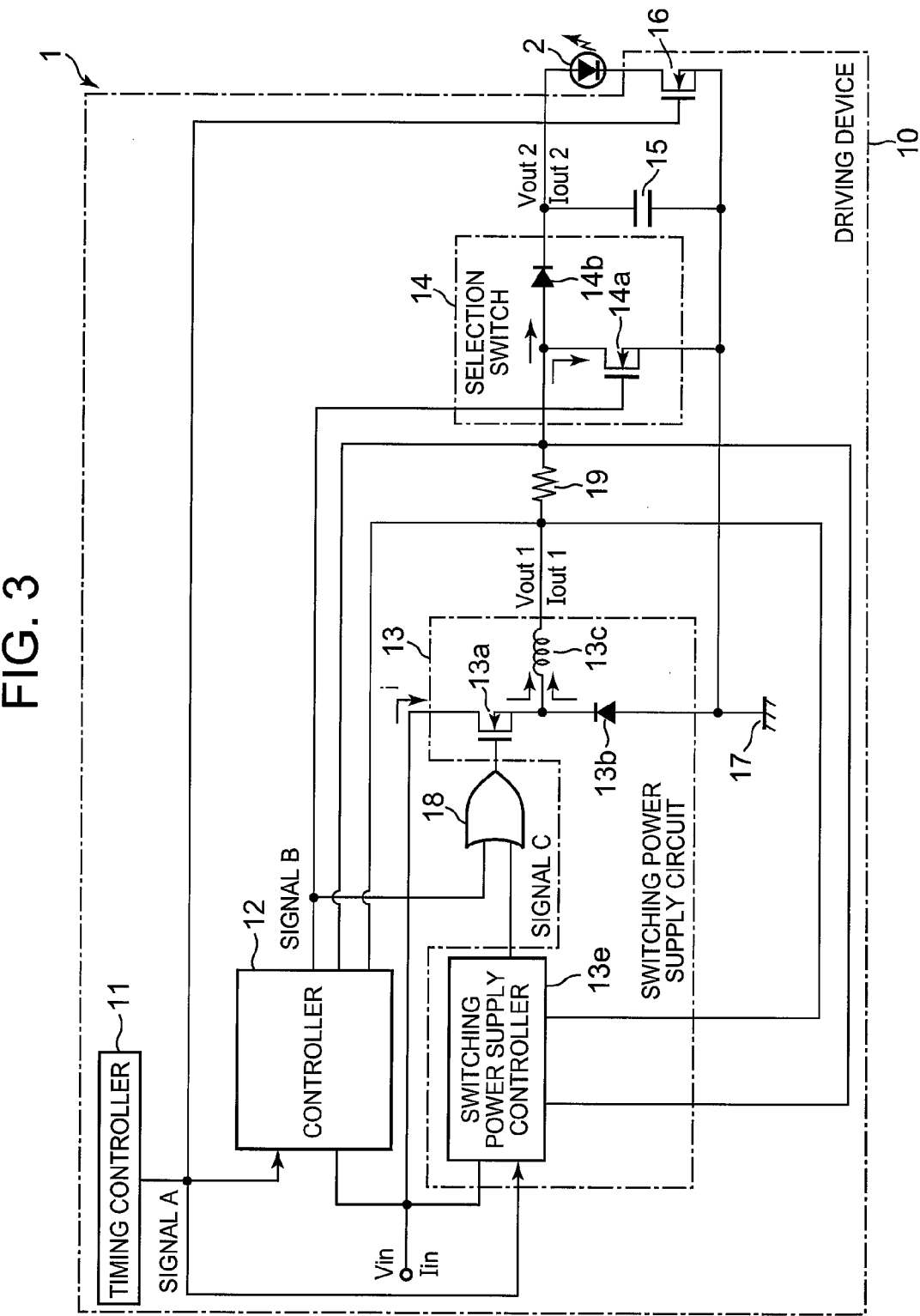
FIG. 3 is a circuit diagram of a light-emitting device in a second embodiment of the present invention.

Specifically, the input voltage Vin is inputted to a controller 12 to be monitored by the controller 12, as shown in FIG. 3. Further, the current of the inductor 13c is inputted to the controller 12 to be monitored by the controller 12. The controller 12 stores the inductance of the inductor 13c.

The controller 12 performs the following processes for each cycle of the timing signal A. First, upon detecting the rising of the timing signal A at the start of the period P1 (see FIG. 2), the controller 12 starts timekeeping from the moment and makes the timing signal B fall. After that, upon detecting the falling of the timing signal A at the end of the period P1, the controller 12 detects and stores the current of the inductor 13c and the input voltage Vin at the moment. The controller 12 then calculates the length of the period P4 from the detected values of the current of the inductor 13c and the input voltage Vin. Specifically, the controller 12 obtains (calculates) a value by dividing the product of the detected value of the current of the inductor 13c and the inductance of the inductor 13c by the detected value of the input voltage Vin, or obtains a corrected value based on the obtained value. The obtained value is the length of the period P4. Then, the length of the period P4 obtained by the controller 12 is subtracted from the cycle of the timing signal A to obtain the difference. After that, when the time elapsed since the start of timekeeping for the timing signal A reaches the obtained difference, the controller 12 makes the timing signal B rise. After that, upon detecting the rising of the timing signal A, the controller 12 resets the detected values of the output current Iout1 and the input voltage Vin stored previously and the obtained difference, resets the time obtained by the timekeeping and restarts timekeeping.

According to the present embodiment, since the length of the period P4 is determined on the basis of the detected values of the current of the inductor 13c and the input voltage Vin, the current level of the inductor 13c at the start of the period P1 approaches the current level of the inductor 13c at the end of the period P1 more accurately. According to the present embodiment, therefore, the current Iout2 of the light-emitting element 2 is rapidly put into a steady state at the start of the period P1. This enables rapid turning on of the light-emitting element 2.

In the case where the resistor 19 is disposed between the cathode of the rectifier element 14b and the light-emitting element 2 and between and the output capacitor 15 and the light-emitting element 2, and where a signal representing the current Iout2 is inputted to the switching power supply controller 13e, another resistor is disposed between the inductor 13c and the anode of the rectifier element 14b. In such a case, the current of the inductor 13c detected with the other resistor (i.e., the voltage of the other resistor) is inputted to the controller 12. Disposing the resistor 19 between the inductor 13c and the anode of the rectifier element 14b as shown in FIG. 3, however, can advantageously simplify the circuit configuration of the driving device 10, because such a resistor 19 can be used both for detecting the output current fed back to the switching power supply controller 13e and for detecting the inductor current inputted to the controller 12.

Third Embodiment

The corresponding parts between a third embodiment and the first embodiment are identical except the following descriptions. The differences between the third embodiment and the first embodiment are described below. The same referential marks are assigned to the corresponding parts between the third embodiment and the first embodiment.

Figure 4:
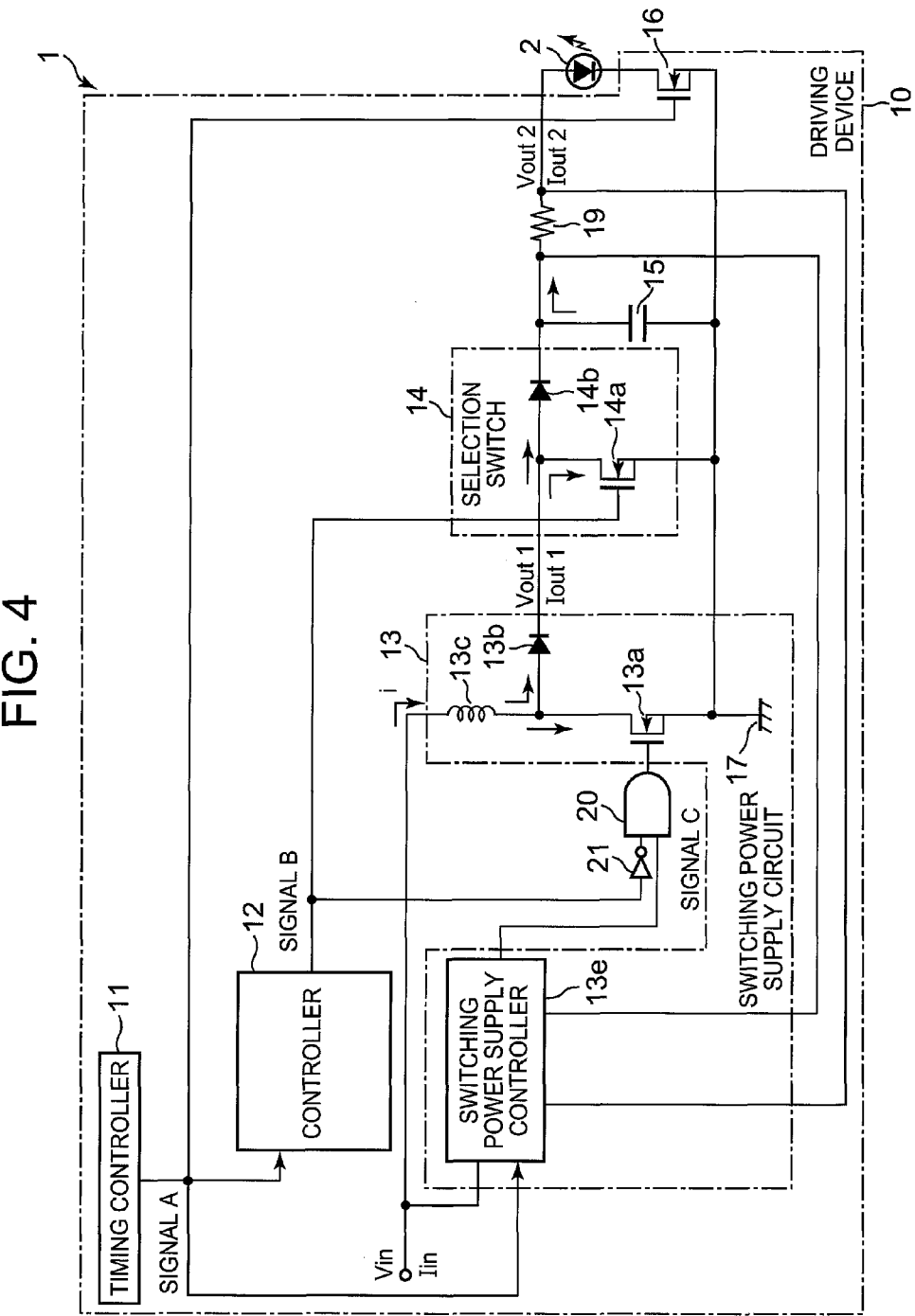
FIG. 4 is a circuit diagram of a light-emitting device in a third embodiment of the present invention.
Figure 5:
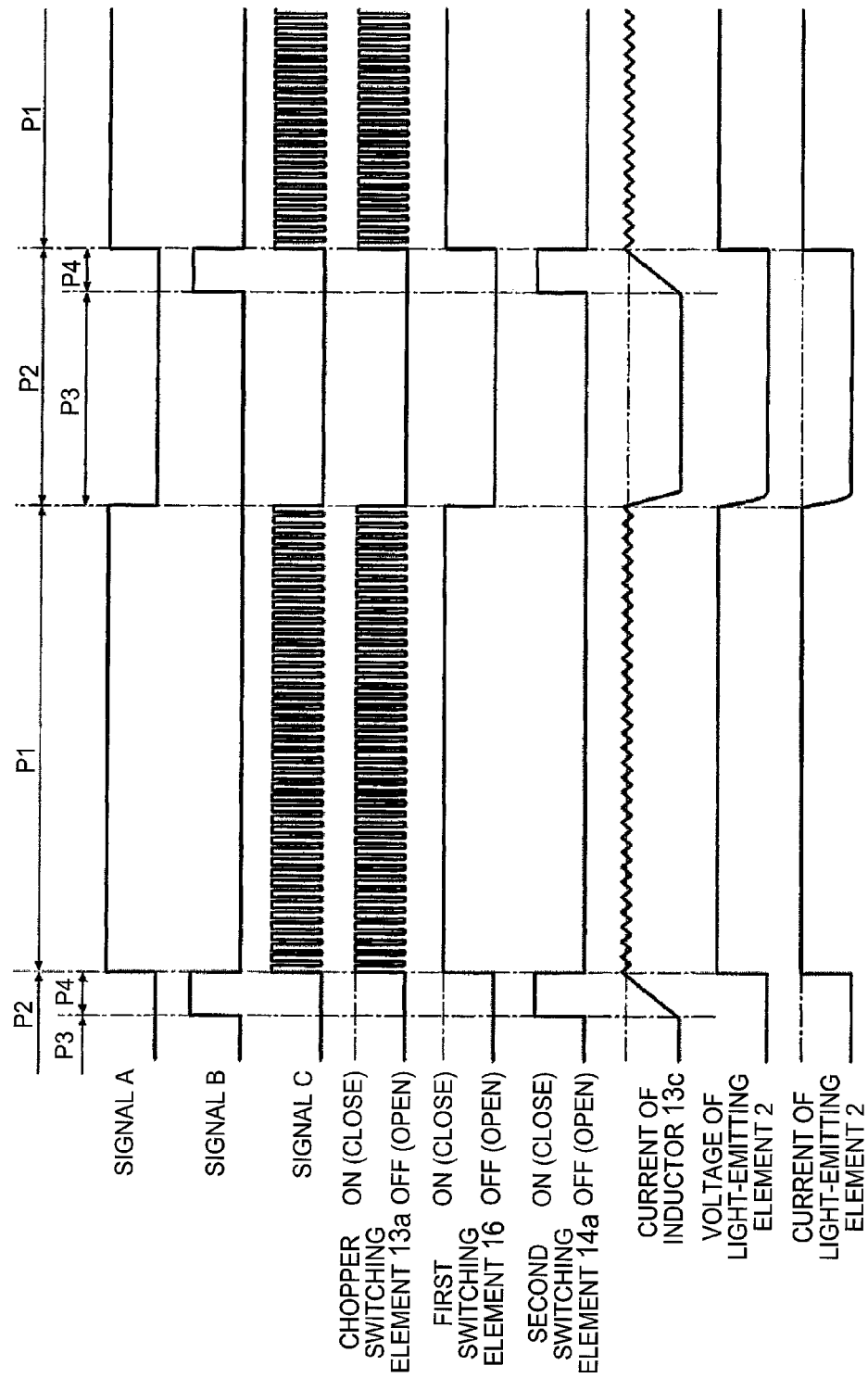
FIG. 5 is a timing chart showing the signal waveform of each element of the light-emitting device in the third embodiment.

FIG. 4 is a circuit diagram of a light-emitting device 1 in the third embodiment. FIG. 5 is a timing chart showing the signal of each element of the light-emitting device 1.

The third embodiment is different from the first embodiment in the following respects.

(1) In the first embodiment, a case where the switching power supply circuit 13 is a buck switching regulator, a preferable type, is described as a concrete example (see FIG. 1).

In contrast, a switching power supply circuit 13 in the third embodiment is a boost switching regulator (see FIG. 4).

(2) The third embodiment includes an AND gate 20 and an inverter 21 instead of the OR gate 18 in the first embodiment. In the third embodiment, a chopper switching element 13a is off through a period P4 during which a timing signal B is at a high level.

(3) In the first embodiment, the output current Iout1 is fed back to the switching power supply controller 13e and the switching power supply controller 13e performs the constant-current control and the PWM control so as to maintain the output current Iout1 constant.

In contrast, in the third embodiment, a current Iout2 applied to a light-emitting element 2 is fed back to a switching power supply controller 13e, and the switching power supply controller 13e performs a constant-current control and a PWM control so as to maintain the current Iout2 constant, as shown in FIG. 4.

(4) In both of the first and third embodiments, the length of the period P4 is a constant and is programmed in advance into the controller 12.

The third embodiment, however, is different from the first embodiment in a preferable example of the length of the period P4. Specifically, in the third embodiment, the length of the period P4 is a value obtained by dividing the product of a target inductor current value and the inductance of an inductor 13c by an input voltage Vin, or a corrected value based on the obtained value. The target inductor current value is a value obtained by converting a constant-current target value. In other words, the target inductor current value is a value obtained by dividing the product of the constant-current target value and the output voltage Vout2 by the input voltage Vin, or a corrected value based on the obtained value. The input voltage Vin and the output voltage Vout2 are values calculated in advance through experiment and design calculation or setting values. The constant-current target value is a predetermined target value of the output current Iout2 in the constant-current control performed by the switching power supply controller 13e. There may be a plurality of constants, i.e., the lengths of the period P4, stored in advance in the controller 12. In such a case, the controller 12 may select one of the constants on the basis of various conditions. This can change a constant flexibly according to various conditions.

The above (1) to (3) are described below in detail.

A first input of the AND gate 20 is connected to the switching power supply controller 13e, and a signal C outputted from the switching power supply controller 13e is inputted to the first input of the AND gate 20. A second input of the AND gate 20 is connected to the output of the inverter 21, and the input of the inverter 21 is connected to the controller 12. A signal B outputted from the controller 12 is inverted by the inverter 21, and the inverted signal of the signal B is inputted to the second input of the AND gate 20. The output of the AND gate 20 is connected to the gate of the chopper switching element 13a. The AND gate 20 outputs a signal representing the logical product of the inverted signal of the timing signal B and the signal C to the gate of the chopper switching element 13a.

One end of the inductor 13c is connected to the input of the switching power supply circuit 13 and is further connected to the direct-current power supply of the input voltage Vin and the input current Iin. The other end of the inductor 13c is connected to a selection switch 14 through a flywheel diode 13b. Specifically, the other end of the inductor 13c is connected to the anode of the flywheel diode 13b, and the cathode of the flywheel diode 13b is connected to the anode of a rectifier element 14b and the drain of a second switching element 14a. The cathode of the flywheel diode 13b is the output of the switching power supply circuit 13.

The drain of the chopper switching element 13a is connected to the other end of the inductor 13c and the anode of the flywheel diode 13b. The source of the chopper switching element 13a is connected to the ground 17.

The resistor 19 is disposed between the cathode of the rectifier element 14b and the light-emitting element 2 and between an output capacitor 15 and the light-emitting element 2. The signal representing the current Iout2 of the light-emitting element 2 (i.e., the voltage of the resistor 19) is inputted to the switching power supply controller 13e.

Next, the behavior of the light-emitting device 1 and the current and voltage of each element are described.

Upon rising of the timing signal A by the timing controller 11, the controller 12 makes the timing signal B fall. At this time (i.e., at the start of the period P1), the circuit of the light-emitting element 2 is closed by a first switching element 16, the switching power supply circuit 13 and its switching power supply controller 13e start operating, the second switching element 14a is switched from on to off, and the selection switch 14 is switched from a second selection state to a first selection state. When the second switching element 14a is off, the anode of the light-emitting element 2 and the output capacitor 15 are electrically connected to the inductor 13c through the rectifier element 14b and the flywheel diode 13b.

Through the subsequent period P1, the inverted signal of the timing signal B (high level) is inputted to the AND gate 20. Accordingly, a PWM signal C outputted from the switching power supply controller 13e is inputted to the gate of the chopper switching element 13a through the AND gate 20. The PWM signal C causes the chopper switching element 13a to be turned on and off repeatedly, and a current i flowing from the input through the inductor 13c to the ground 17 is turned on and off (chopped) by the chopper switching element 13a. When the chopper switching element 13a is on, a current flows from the input of the switching power supply circuit 13 through the inductor 13c and the chopper switching element 13a to the ground 17, which causes accumulation of energy in the inductor 13c. At this time, a current is not supplied on the output side of the switching power supply circuit, but an electric charge which has been accumulated in the output capacitor 15 causes a current to flow from the output capacitor 15 through the resistor 19 to the light-emitting element 2. Next, when the chopper switching element 13a is off, a current flows from the input of the switching power supply circuit 13 through the inductor 13c, the flywheel diode 13b and the rectifier element 14b to charge the output capacitor 15, and a current further flows through the resistor 19 to the light-emitting element 2. Then, the energy is released from the inductor 13c, and an electric charge is accumulated in the output capacitor 15. Repeating such processes converts the input voltage Vin to the output voltage Vout1 and further to the voltage Vout2 of the light-emitting element 2, and converts the input current Iin to the output current Iout1 and further to the current Iout2 of the light-emitting element 2.

The switching power supply controller 13e controls the duty cycle of the PWM signal C on the basis of the current Iout2 detected with the resistor 19 (i.e., the voltage of the resistor 19) and the constant-current target value. Thus, the current Iout2 is controlled to be brought close to the constant-current target value and to be maintained at it.

At the end of the period P1, the timing controller 11 makes the timing signal A fall. At the moment, the first switching element 16 is put into an off-state to switch off the light-emitting element 2. During the subsequent periods P3 and P4, the first switching element 16 remains in the off-state, and thus, the light-emitting element 2 remains in the off-state.

At the end of the period P1, the timing signal A falls, which thereby stops the switching power supply controller 13e and stops the oscillation of the output signal C from the switching power supply controller 13e. Therefore, the repeated turning on and off of the chopper switching element 13a ends, and the current of the inductor 13c falls. During the subsequent period P3, the chopper switching element 13a remains in the off-state.

Turning off of the first switching element 16 at the end of the period P1 leads to retention of an electric charge accumulated in the output capacitor 15 and a parasitic capacitor in the wiring between the rectifier element 14b and the light-emitting element 2. During the subsequent periods P3 and P4, the electric charge of the output capacitor 15 is retained and therefore the voltage Vout2 of the driving device 10 hardly drops.

After a lapse of a predetermined period from the rising of the timing signal A, namely, at the end of the period P3 and at the start of the period P4, the timing signal B rises. Then, the second switching element 14a is switched from off to on, and the selection switch 14 is switched from the first selection state to the second selection state. This causes the anode of the light-emitting element 2 and the output capacitor 15 to be electrically disconnected from the inductor 13c due to the rectifying action of the rectifier element 14b. Accordingly, a current flows from the input of the switching power supply circuit 13 through the inductor 13c, the flywheel diode 13b and the second switching element 14a to the ground 17.

At the end of the period P3, the inverted signal of the timing signal B is switched to a low level to be inputted to the AND gate 20. Therefore, the controller 12 forces the chopper switching element 13a to be turned off independently of the timing controller 11 and the switching power supply controller 13e. That is, the controller 12 controls the chopper switching element 13a to be turned off at the time when the selection switch 14 is switched from the first selection state to the second selection state. Since the chopper switching element 13a remains in an off-state through the period P3, too, the chopper switching element 13a remains in an off-state through the periods P3 and P4.

During the subsequent period P4, the current of the inductor 13c increases, and energy is accumulated in the inductor 13c. Since the length of the period P4 is determined through experiment and design calculation in advance in view of the circuit characteristics of the switching power supply circuit 13, for example, the current of the inductor 13c at the end of the period P4 becomes substantially the same as a predetermined target inductor current value.

At the start of the subsequent period P1 (i.e., at the end of the period P4), the timing signal A rises, the timing signal B falls, and the inverted signal of the timing signal B rises. Accordingly, the repeated turning on and off of the chopper switching element 13a starts, the switching power supply circuit 13 starts operating, the second switching element 14a is switched from on to off, and the selection switch 14 is switched from the second selection state to the first selection state. Further, the first switching element 16 is switched from off to on.

Since an electric charge is retained in the output capacitor 15 through the periods P3 and P4, the voltage Vout2 of the light-emitting element 2 is put into a steady state as soon as or immediately after the switching power supply circuit 13 starts operating. Further, since the current of the inductor 13c increases during the period P4, the output current Iout1 of the switching power supply circuit 13 reaches the target inductor current value and the current Iout2 of the light-emitting element 2 reaches the fixed constant-current target value as soon as or immediately after the switching power supply circuit 13 starts operating. That is, reduction in current change due to the inductive effect of the inductor 13c does not occur at the time when the switching power supply circuit 13 starts operating. Therefore, the light-emitting element 2 emits light at an intended intensity as soon as or immediately after the switching power supply circuit 13 starts operating.

Therefore, according to the present embodiment, since the current Iout2 of the light-emitting element 2 rapidly rises at the start of the period P1, the light-emitting element 2 can be turned on more rapidly.

The output signal C from the switching power supply controller 13e may be inputted to the gate of the chopper switching element 13a without the AND gate 20 and the inverter 21.

Fourth Embodiment

The corresponding parts between a fourth embodiment and the third embodiment are identical except the following descriptions. The differences between the fourth embodiment and the third embodiment are described below. The same referential marks are assigned to the corresponding parts between the fourth embodiment and the third embodiment.

Figure 6:
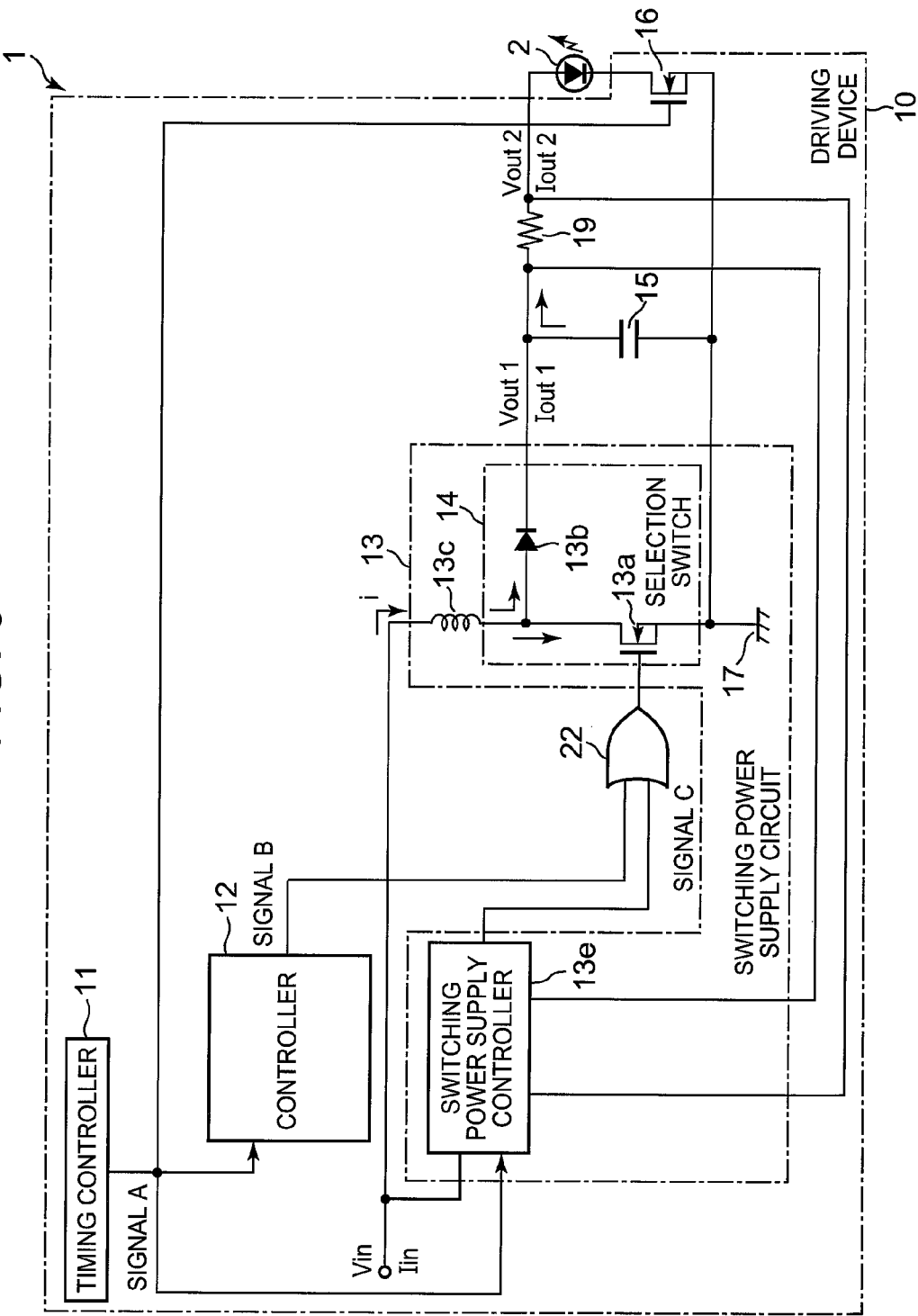
FIG. 6 is a circuit diagram of a light-emitting device in a fourth embodiment of the present invention.
Figure 7:
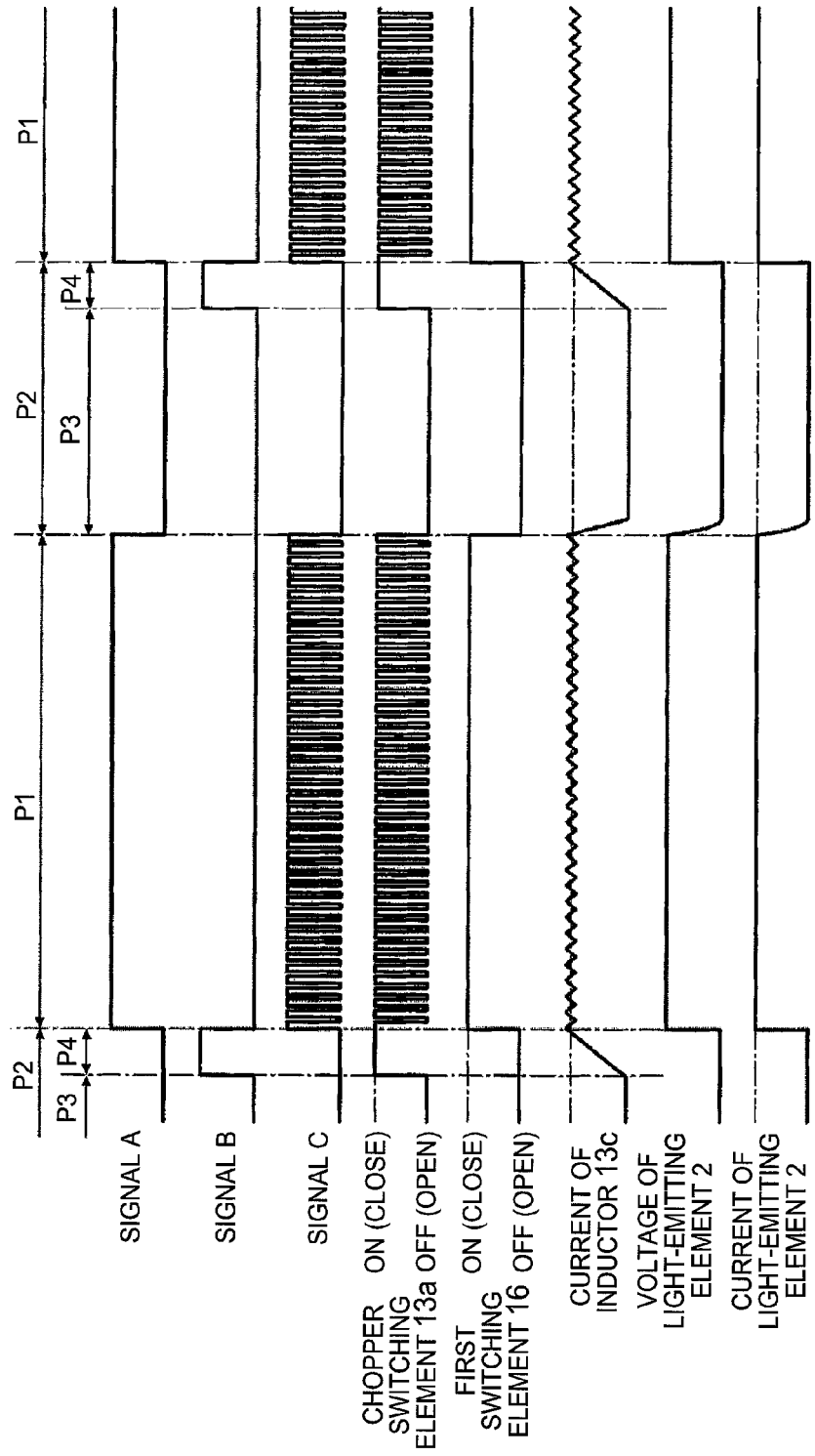
FIG. 7 is a timing chart showing the signal waveform of each element of the light-emitting device in the fourth embodiment.

FIG. 6 is a circuit diagram of a light-emitting device 1 in the fourth embodiment. FIG. 7 is a timing chart showing the signal of each element of the light-emitting device 1.

The fourth embodiment is different from the third embodiment in the following respects.

(1) In the third embodiment, the selection switch 14 is connected to the output of the switching power supply circuit 13, and the selection switch 14 is connected to the inductor 13c through the flywheel diode 13b (see FIG. 4).

In contrast, in the fourth embodiment, the combination of a chopper switching element 13a and a flywheel diode 13b also serves as a selection switch 14 disposed between an inductor 13c and an output capacitor 15. That is, the chopper switching element 13a not only turns on and off an input current but also serves as an element equivalent to the second switching element 14a of the selection switch 14 in the third embodiment. Further, the flywheel diode 13b serves not only as a flywheel diode to secure a current pathway when the chopper switching element 13a is off during an on-off switching of the input current by the chopper switching element 13a, but also as an element equivalent to the rectifier element 14b of the selection switch 14 in the third embodiment. The cathode of the flywheel diode 13b is connected to the output capacitor 15 and a resistor 19. Since the combination of the chopper switching element 13a and the flywheel diode 13b also serves as the selection switch 14 in this way, the second switching element 14a and the rectifier element 14b in the third embodiment need not be provided. This prevents an increase in cost of a driving device 10 and prevents the driving device 10 from getting complicated in the fourth embodiment.

(2) In the fourth embodiment, an OR gate 22 is provided instead of the AND gate 20 and the inverter 21 in the third embodiment. A chopper switching element 13a is in an on-state through a period P4 during which a timing signal B is at a high level. Further, a signal C outputted from a switching power supply controller 13e is inputted to a first input of the OR gate 22, and the signal B outputted from a controller 12 is inputted to a second input of the OR gate 22. The OR gate 22 outputs a signal representing the logical sum of the signals C and B to the gate of the chopper switching element 13a.

Next, the behavior of the light-emitting device 1 is described.

At the start of the period P1, the timing signal A rises and the timing signal B falls. At this time, the circuit of a light-emitting element 2 is closed by a first switching element 16, and the switching power supply circuit 13 and its switching power supply controller 13e start operating. Further, the timing signal B at a low level is inputted to the OR gate 22. As a result, the chopper switching element 13a is switched from on to off on the basis of the timing signal B, the selection switch 14 is switched from a second selection state to a first selection state, and an inductor 13c is electrically connected to the output capacitor 15 and the light-emitting element 2 through the flywheel diode 13b. In the subsequent period P1, however, the PWM signal C outputted from the switching power supply controller 13e is inputted to the OR gate 22, and therefore, the on-off state of the chopper switching element 13a is based on the PWM signal C in preference to the timing signal B. As a result, the chopper switching element 13a is turned on and off repeatedly in response to the PWM signal C. The repeated turning on and off of the chopper switching element 13a causes repeated accumulation/release of energy in/from the inductor 13c. This converts the input voltage Vin to the output voltage Vout1 and further to the voltage Vout2 of the light-emitting element 2, and converts the input current Iin to the output current Iout1 and further to the current Iout2 of the light-emitting element 2.

At the end of the period P1, the timing signal A falls, which puts the first switching element 16 into an off-state to switch off the light-emitting element 2. Through the subsequent periods P3 and P4, the first switching element 16 remains in the off-state and thus the light-emitting element 2 remains in the off-state. This causes an electric charge to be retained in the output capacitor 15. As a result, the output voltage Vout2 of the driving device 10 is held almost without dropping.

At the end of the period P1, the switching power supply controller 13e stops operating, and the oscillation of the output signal C from the switching power supply controller 13e stops. During the subsequent period P3, both the signals B and C inputted to the OR gate 22 are at a low level. Accordingly, the chopper switching element 13a remains in an off-state without being repeatedly turned on and off, the selection switch 14 remains in the first selection state, and the output capacitor 15 and the anode of the light-emitting element 2 are electrically connected to the inductor 13c.

At the end of the period P3, the timing signal B rises, the selection switch 14 is put into the second selection state, and the chopper switching element 13a is switched from off to on. As a result, the other end of the inductor 13c (i.e., the connection point of the inductor 13c with the anode of the flywheel diode 13b) is at the potential of the ground 17. Since the anode of the light-emitting element 2 and the output capacitor 15 are electrically disconnected from the inductor 13c due to the rectifying action of the flywheel diode 13b, the light-emitting element 2 and the output capacitor 15 are unaffected by the inductor 13c. Then, a current flows from the input of the switching power supply circuit 13 through the inductor 13c and the chopper switching element 13a to the ground 17. During the subsequent period P4, the current of the inductor 13c increases and energy is accumulated in the inductor 13c. Since the length of the period P4 is determined through experiment and design calculation in advance in view of the circuit characteristics of the switching power supply circuit 13, for example, the current of the inductor 13c at the end of the period P4 becomes substantially the same as a predetermined target inductor current value.

At the start of the subsequent period P1, the selection switch 14 is switched from the second selection state to the first selection state, the switching power supply circuit 13 starts operating, the repeated turning on and off of the chopper switching element 13a is started, and the first switching element 16 is switched from off to on. Since an electric charge has been retained in the output capacitor 15 and the current of the inductor 13c has been increased by the start of the period P1, the voltage Vout2 of the light-emitting element 2 is put into a steady state and the current Iout2 of the light-emitting element 2 reaches a fixed constant-current target value as soon as or immediately after the switching power supply circuit 13 starts operating. Therefore, according to the present embodiment, the light-emitting element 2 can be turned on more rapidly.

Fifth Embodiment

The corresponding parts between a fifth embodiment and the third embodiment are identical except the following descriptions. The differences between the fifth embodiment and the third embodiment are described below. The same referential marks are assigned to the corresponding parts between the fifth embodiment and the third embodiment.

In the above-described third embodiment, the length of the period P4 during which the timing signal B is at a high level (see FIG. 5) is a constant and is programmed in advance into the controller 12. In contrast, in the fifth embodiment, the length of a period P4 is a variable and is determined on the basis of an input voltage Vin and the current of an inductor 13c.

Figure 8:
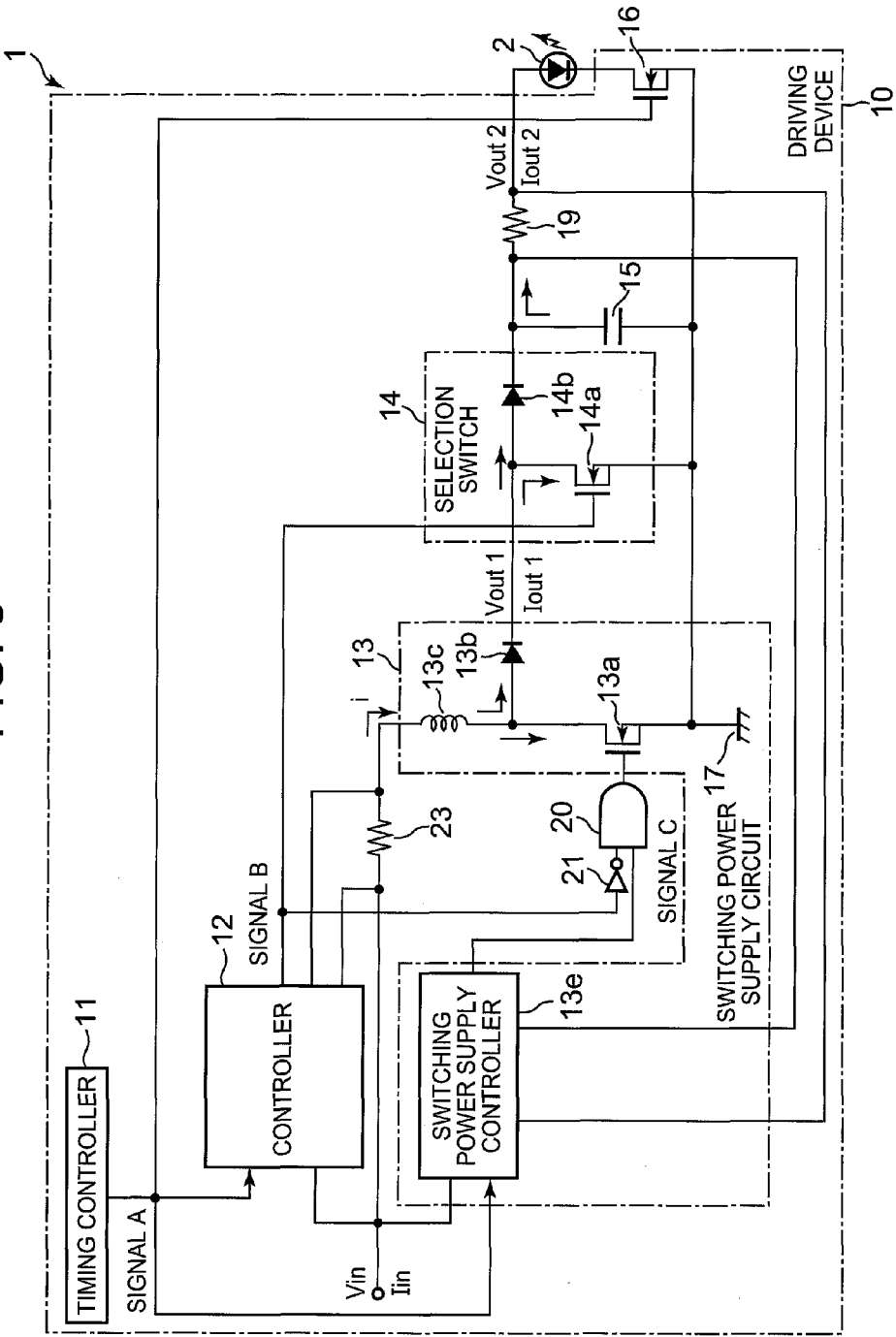
FIG. 8 is a circuit diagram of a light-emitting device in a fifth embodiment of the present invention.

Specifically, the input voltage Vin is inputted to a controller 12 to be monitored by the controller 12, as shown in FIG. 8. A resistor 23 and the inductor 13c are connected in series between the input of a switching power supply circuit 13 and a chopper switching element 13a. The current of the inductor 13c is detected with the resistor 23. The current of the inductor 13c is inputted to the controller 12 to be monitored by the controller 12. The controller 12 stores the inductance of the inductor 13c.

The controller 12 performs the following processes for each cycle of a timing signal A. First, upon detecting the rising of the timing signal A, the controller 12 starts timekeeping and makes the timing signal B fall. After that, upon detecting the falling of the timing signal A, the controller 12 detects and stores the current of the inductor 13c and the input voltage Vin at the moment. The controller 12 then calculates the length of the period P4 from the detected values of the current of the inductor 13c and the input voltage Vin. Specifically, the controller 12 obtains (calculates) a value by dividing the product of the detected value of the current of the inductor 13c and the inductance of the inductor 13c by the detected value of the input voltage Vin, or obtains a corrected value based on the obtained value. The obtained value is the length of the period P4. Then, the length of the period P4 obtained by the controller 12 is subtracted from the cycle of the timing signal A to obtain the difference. After that, when the time elapsed since the start of timekeeping for the timing signal A reaches the obtained difference, the controller 12 makes the timing signal B rise. After that, upon detecting the rising of the timing signal A, the controller 12 resets the detected values of the inductor current and the input voltage Vin stored previously and the obtained difference, resets the time obtained by the timekeeping and restarts timekeeping.

According to the present embodiment, since the length of the period P4 is determined on the basis of the detected values of the current of the inductor 13c and the input voltage Vin, the current level of the inductor 13c at the start of the period P1 approaches the current level of the inductor 13c at the end of the period P1 more accurately. Therefore, the current Iout2 of the light-emitting element 2 is rapidly put into a steady state at the start of the period P1. This enables rapid turning on of the light-emitting element 2.

Figure 9:
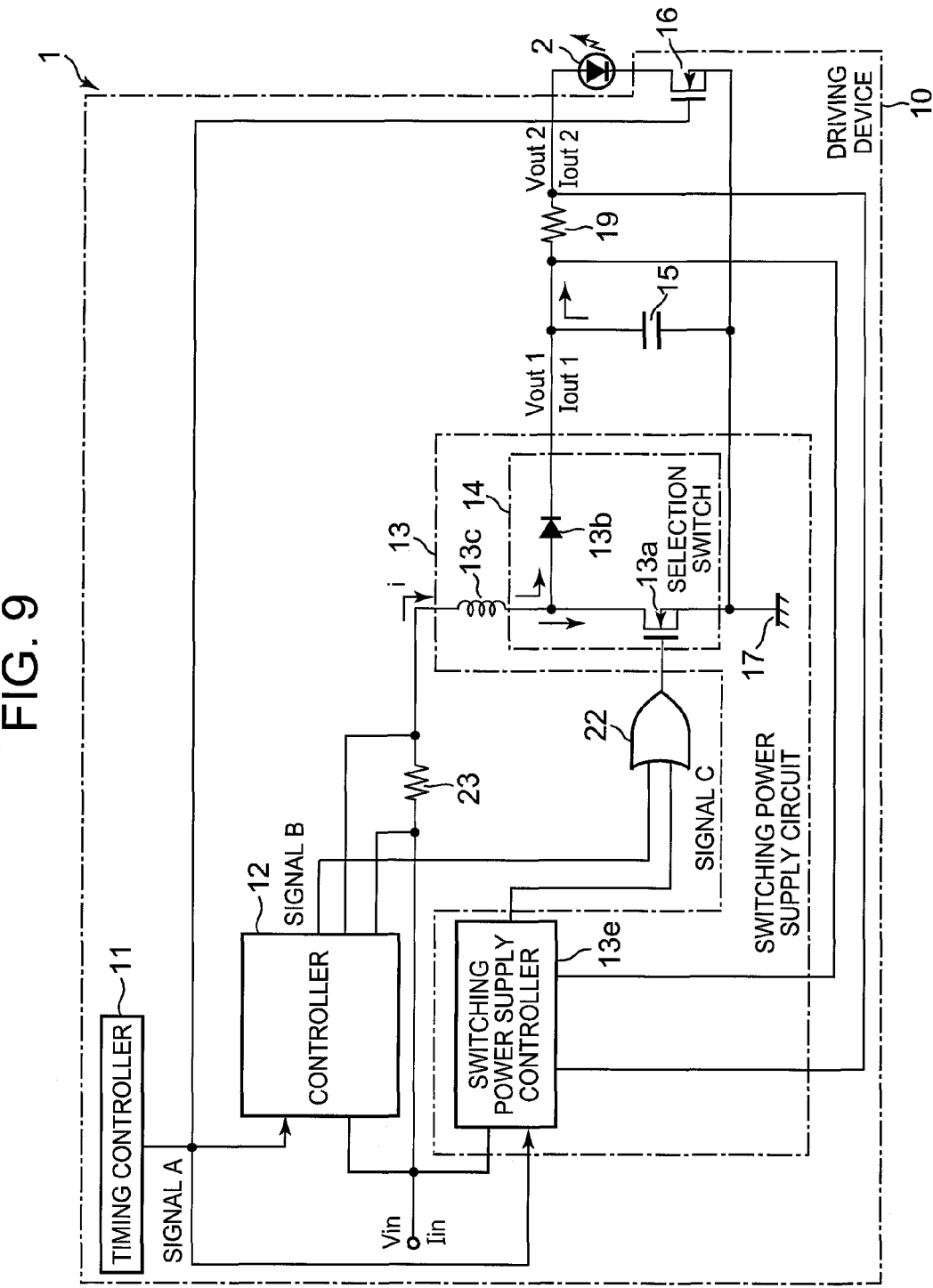
FIG. 9 is a circuit diagram of a light-emitting device in a modification of the fifth embodiment of the present invention.

The difference between fifth embodiment and the third embodiment may be applied to the fourth embodiment (see FIG. 9). That is, in the case where the combination of a chopper switching element 13a and a flywheel diode 13b also serves as a selection switch 14 (see the description of the fourth embodiment), a controller 12 may calculate the length of a period P4 from the detected values of the current of an inductor 13c and an input voltage Vin to control the timing of rising of a timing signal B as described above.

In the case of a boost switching regulator, the voltage Vout2 based on a target current Iout2 may be fed back to determine the length of the period P4.

Sixth Embodiment

The corresponding parts between a sixth embodiment and the first embodiment are identical except the following descriptions. The differences between the sixth embodiment and the first embodiment are described below. The same referential marks are assigned to the corresponding parts between the sixth embodiment and the first embodiment.

Figure 10:
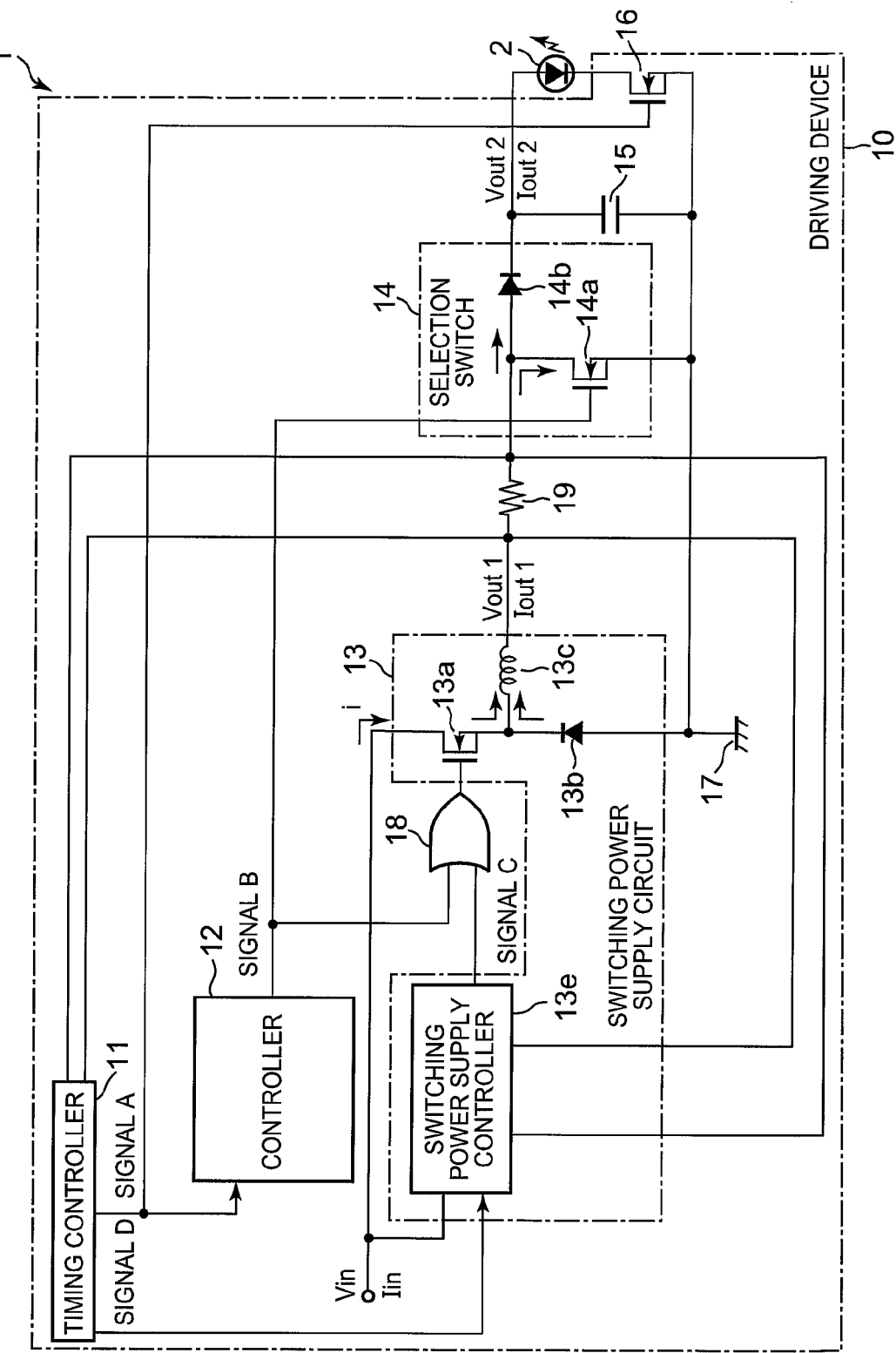
FIG. 10 is a circuit diagram of a light-emitting device in a sixth embodiment of the present invention.
Figure 11:
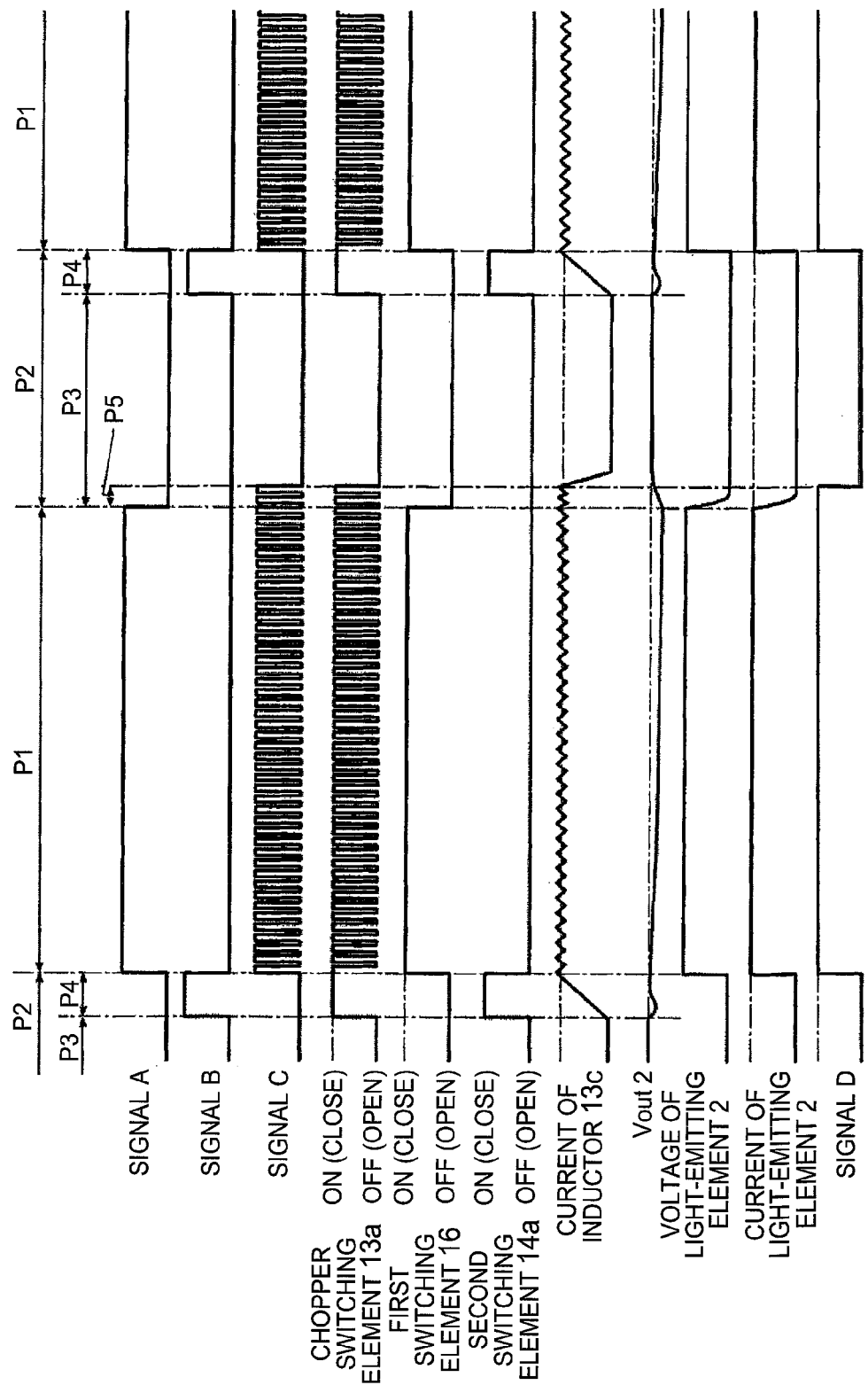
FIG. 11 is a timing chart showing the signal waveform of each element of the light-emitting device in the sixth embodiment.

In the above-described first embodiment, the timing controller 11 outputs the timing signal A to the switching power supply controller 13e. In contrast, in the sixth embodiment, a timing controller 11 outputs a timing signal D to a switching power supply controller 13e as shown in FIGS. 10 and 11.

Specifically, the timing controller 11 makes the timing signal D rise at the time when a timing signal A rises. Further, the timing controller 11 makes the timing signal D fall after the falling of the timing signal A. The falling of the timing signal D occurs after the falling of the timing signal A and before the rising of a timing signal B.

Accordingly, the timing controller 11 starts operating a switching power supply circuit 13 and the switching power supply controller 13e at the time when a first switching element 16 is closed. Further, the timing controller 11 stops operating the switching power supply circuit 13 and the switching power supply controller 13e after the opening of the first switching element 16.

During a period P1, a light-emitting element 2 is on, which causes a gradual increase in temperature of the light-emitting element 2 due to its self-heating. During a period P2, the light-emitting element 2 is off, which causes a gradual decrease in temperature of the light-emitting element 2 due to its self-radiation. During the period P1, the current Iout2 of the light-emitting element 2 remains substantially constant, and the voltage Vout2 of the light-emitting element 2 gradually and slightly decreases. Therefore, the voltage Vout2 of the light-emitting element 2 at the end of the period P1 is lower than that at the start of the period P1. That is due to the voltage-temperature characteristics of the light-emitting element 2, where the voltage is dependent on the temperature.

Specifically, when the current of the light-emitting element 2 is maintained constant, the drive (operating) voltage of the light-emitting element 2 becomes lower as the temperature of the light-emitting element 2 becomes higher.

During the period P2, subsequent to the period P1, however, the light-emitting element 2 is off and its temperature decreases, which results in a gradual increase in the voltage required for the current at the next turning on to be the same as the current at the previous turning off again. At the end of the period P2 (i.e., at the start of the next period P1), therefore, the voltage required for the current at the next turning on to be the same as the current at the previous turning off of the light-emitting element 2 becomes higher.

If the switching power supply circuit 13 and the switching power supply controller 13e are disabled at the end of the period P1 as in the first embodiment, the voltage Vout2 of the light-emitting element 2 at the end of the period P1 is held at the output capacitor 15, and the held voltage Vout2 is applied to the light-emitting element 2 at the start of the next period P1. Therefore, the voltage Vout2 is lower than the voltage required for the current at the next turning on to be the same as the current at the previous turning off of the light-emitting element 2. This results in deficiency in voltage of the light-emitting element 2.

In the present embodiment, however, the switching power supply circuit 13 and the switching power supply controller 13e continue operating after the period P1 is over (i.e., after the light-emitting element 2 is turned off). This can compensate for the deficiency in the voltage Vout2 of the light-emitting element 2 as described above, even if the voltage Vout2 of the light-emitting element 2 decreases during the period P1. Specifically, during a period P5 from the time when the circuit of the light-emitting element 2 is opened by the first switching element 16 (i.e., at the time of falling of the timing signal A and at the end of the period P1) to the time when the switching power supply circuit 13 and the switching power supply controller 13e stop operating (i.e., at the time of falling of the timing signal D), an electric charge is charged into an output capacitor 15 and a parasitic capacitor in the wiring from the output of the switching power supply circuit 13 to the light-emitting element 2, resulting in a gradual increase in the voltage Vout2 of the light-emitting element 2. As a result, the deficiency in voltage of the light-emitting element 2 owing to heat generation during the period P1 can be compensated for. Since the first switching element 16 closes the circuit of the light-emitting element 2 in response to the falling of the timing signal A, a current does not flow through the light-emitting element 2 even if the switching power supply circuit 13 and the switching power supply controller 13e continue operating after the falling of the timing signal A.

According to the present embodiment, the decrease in voltage Vout2 of the light-emitting element 2 due to heat generation during the period P1 is compensated for in the period P5. Therefore, the light-emitting element 2 can flash more rapidly.

The period P5 is a constant or a variable. In the case where the period P5 is a constant, it is programmed in advance into a controller 11. The period P5, a constant, is determined through experiment and design calculation in view of the circuit characteristics of the switching power supply circuit 13, the voltage-temperature characteristics of the light-emitting element 2, the cycle of the timing signal A, the on-time duty cycle of the timing signal A and the self-discharge characteristics of the output capacitor 15, for example.

In the case where the period P5 is a variable, it is determined on the basis of the output voltage Vout1 of the switching power supply circuit 13. Specifically, the output voltage Vout1 of the switching power supply circuit 13 is fed back to the timing controller 11 to be monitored and compared with a comparison value by the timing controller 11 after the falling of the timing signal A. At this time, the first switching element 16 is off and therefore the output voltage Vout1 gradually increases. Upon finding that the output voltage Vout1 of the switching power supply circuit 13 exceeds the comparison value, the timing controller 11 makes the timing signal D fall.

The comparison value to be compared with the output voltage Vout1 is a constant or a variable. In the case where the comparison value is a constant, it is programmed in advance into the controller 11. In this case, the comparison value is determined through experiment and design calculation in view of the circuit characteristics of the switching power supply circuit 13, the voltage-temperature characteristics of the light-emitting element 2, the cycle of the timing signal A, the on-time duty cycle of the timing signal A and the self-discharge characteristics of the output capacitor 15, for example.

On the other hand, in the case where the comparison value is a variable, it is determined on the basis of the output voltage Vout1 and the output current Iout1 of the switching power supply circuit 13. Specifically, the output voltage Vout1 and the output current Iout1 of the switching power supply circuit 13 are fed back to the timing controller 11 to be monitored by the timing controller 11 after the rising of the timing signal A. The timing controller 11, then, determines a comparison value to be a value of the output voltage Vout1 at the time when the output current Iout1 reaches a predetermined level, or to be a corrected value obtained by increasing or decreasing the value. The predetermined level is equal to a constant-current target value at which the output current Iout1 of the switching power supply circuit 13 is maintained by the switching power supply controller 13e.

After the comparison value is determined, the timing controller 11 makes the timing signal D fall and resets the comparison value if the output voltage Vout1 of the switching power supply circuit 13 exceeds the comparison value after the falling of the timing signal as described above. The determination and the reset of the comparison value is performed for each cycle of the timing signal A, and the comparison of the output voltage Vout1 of the switching power supply circuit 13 with the comparison value is also performed for each cycle of the timing signal A.

In the case where the period P5 is a variable, the period P5 may be determined on the basis of the voltage Vout2 and the current Iout2 of the light-emitting element 2 fed back to the timing controller 11. In this case, "the output voltage Vout1 of the switching power supply circuit 13" is replaced with "the voltage Vout2 of the light-emitting element 2", and "the output current Iout1 of the switching power supply circuit 13" is replaced with "the current Iout2 of the light-emitting element 2" in the above description that the period P5 is determined on the basis of the output voltage Vout1 and the output current Iout1 of the switching power supply circuit 13.

Further, determination of the period P4 based on the input voltage Vin and the output current Iout1 of the switching power supply circuit 13 in the second embodiment may be applied to the sixth embodiment.

Further, the timing controller 11 outputting the timing signal D to the switching power supply controller 13e as in the sixth embodiment may be applied to the third embodiment where the boost-type switching power supply circuit 13, the AND gate 20 and the inverter 21 are used.

Further, the timing controller 11 outputting the timing signal D to the switching power supply controller 13e as in the sixth embodiment may be applied to the fourth embodiment where the boost-type switching power supply circuit 13 and the OR gate 22 are used and where the combination of the chopper switching element 13a and the flywheel diode 13b also serves as the selection switch 14.

Further, the timing controller 11 outputting the timing signal D to the switching power supply controller 13e as in the sixth embodiment may be applied to the fifth embodiment where the boost-type switching power supply circuit 13 is used and where the controller 12 calculates the length of the period P4 from the detected values of the current of the inductor 13c and the input voltage Vin (see FIGS. 8 and 9).

Specifically, the characteristic features of the sixth embodiment may be combined with any of the first to fifth embodiments.

Modification of First to Sixth Embodiments

Figure 12:
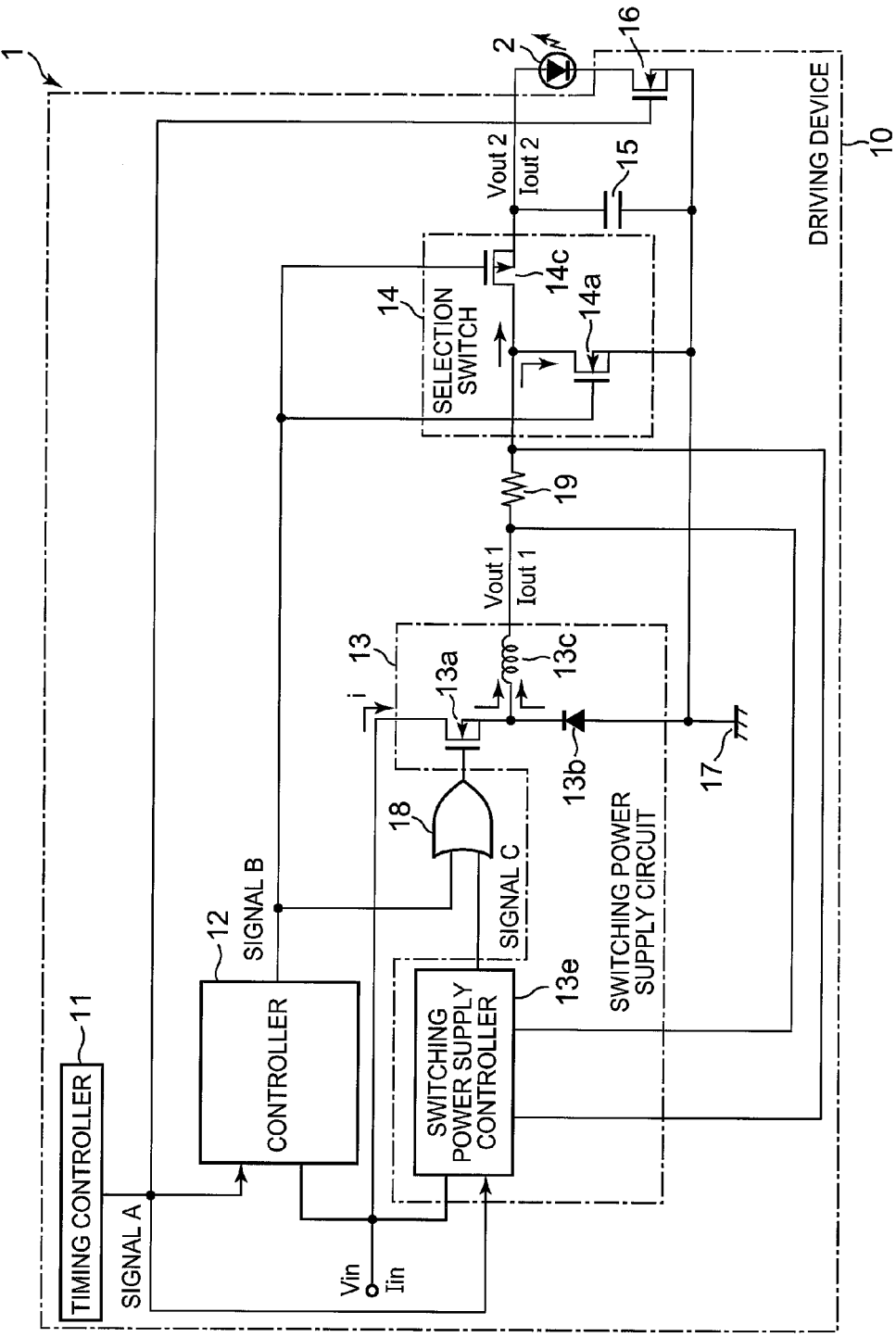
FIG. 12 is a circuit diagram of a light-emitting device in a modification of the first to sixth embodiments.

Embodiments to which the present invention is applicable are not limited to those described above, but the above-described embodiments may be modified as appropriate without departing from the scope of the invention. Some modifications are described below. The modifications described below are the same as the above-described embodiments except for the modified parts. In addition, the modifications described below may be combined with each other wherever possible.
(1) The controller 12 may be a logic circuit.
(2) Although the light-emitting element 2 is taken as an example of a load driven by the driving device 10, a load except the light-emitting element 2 may be turned on and off by the driving device 10.
(3) The first switching element 16 may be a P-channel field-effect transistor. In this case, the timing signal A is inverted to be inputted to the gate of the first switching element 16.
(4) The chopper switching element 13a may be a P-channel field-effect transistor. In this case, the signals outputted from the OR gate 18, the AND gate 20 and the OR gate 22 are inverted to be inputted to the gate of the chopper switching element 13a.
(5) The second switching element 14a may be a P-channel field-effect transistor. In this case, the timing signal B is inverted to be inputted to the gate of the second switching element 14a.
(6) FIG. 12 illustrates a modification where the rectifier element 14b of the light-emitting device 1 in the first embodiment (see FIG. 1) is replaced with a switching element 14c (hereinafter referred to as a third switching element 14c).

The third switching element 14c is a field-effect transistor. One of the source and drain of the third switching element 14c is connected to the output of a switching power supply circuit 13 (i.e., the inductor 13c) through a resistor 19, and the other of the source and drain is connected to the anode of a light-emitting element 2. In the case where the third switching element 14c is a P-channel field-effect transistor, the timing signal B is inputted to the gate of the third switching element 14c without being inverted, as shown in FIG. 12. In the case where the third switching element 14c is an N-channel field-effect transistor, the timing signal B is inverted to be inputted to the gate of the third switching element 14c. Accordingly, the third switching element 14c is off when the second switching element 14a is on, and the third switching element 14c is on when the second switching element 14a is off. The rectifier element 14b in the second, third and fifth embodiments may be replaced with the third switching element 14c.
(7) The switching power supply circuit 13 may be a constant-voltage power supply circuit. Specifically, the switching power supply circuit 13 controls the output voltage Vout1 (or voltage Vout2) to remain constant regardless of the output current Iout1 (or output current Iout2). The switching power supply controller 13e of the switching power supply circuit 13 preferably feeds back the output voltage Vout1 (or voltage Vout2) and generates a PWM signal C having the duty cycle based on the fed-back voltage to control the output voltage Vout1 (or voltage Vout2) so as to remain constant.
(8) In the case where the controller 12 is a microcomputer, the controller 12 may carry out functions equivalent to those of the timing controller 11 through programs.
(9) In the case where the controller 12 is a microcomputer, the controller 12 may carry out functions equivalent to those of the switching power supply controller 13e through programs.

In this case, the switching power supply controller 13e can be omitted, and a portion of the controller 12 functioning in the same manner as the switching power supply controller 13e constitutes a part of the switching power supply circuit 13.
(10) The controller 12 may make the timing signal B fall before the rising of the timing signal A. In other words, the timing controller 11 may make the timing signal A rise slightly after the falling of the timing signal B.

In this case, although the current of the inductor 13c slightly decreases after the falling of the timing signal B, the timing signal A rises immediately after the falling of the timing signal B. Accordingly, the current of the inductor 13c does not reach zero at the time of the rising of the timing signal A. Therefore, the current Iout2 of the light-emitting element 2 rises more rapidly at the time of rising of the timing signal A (i.e., at the start of the period P1) than in the case where the current of the inductor 13c rises from zero.

Seventh Embodiment

Figure 13:
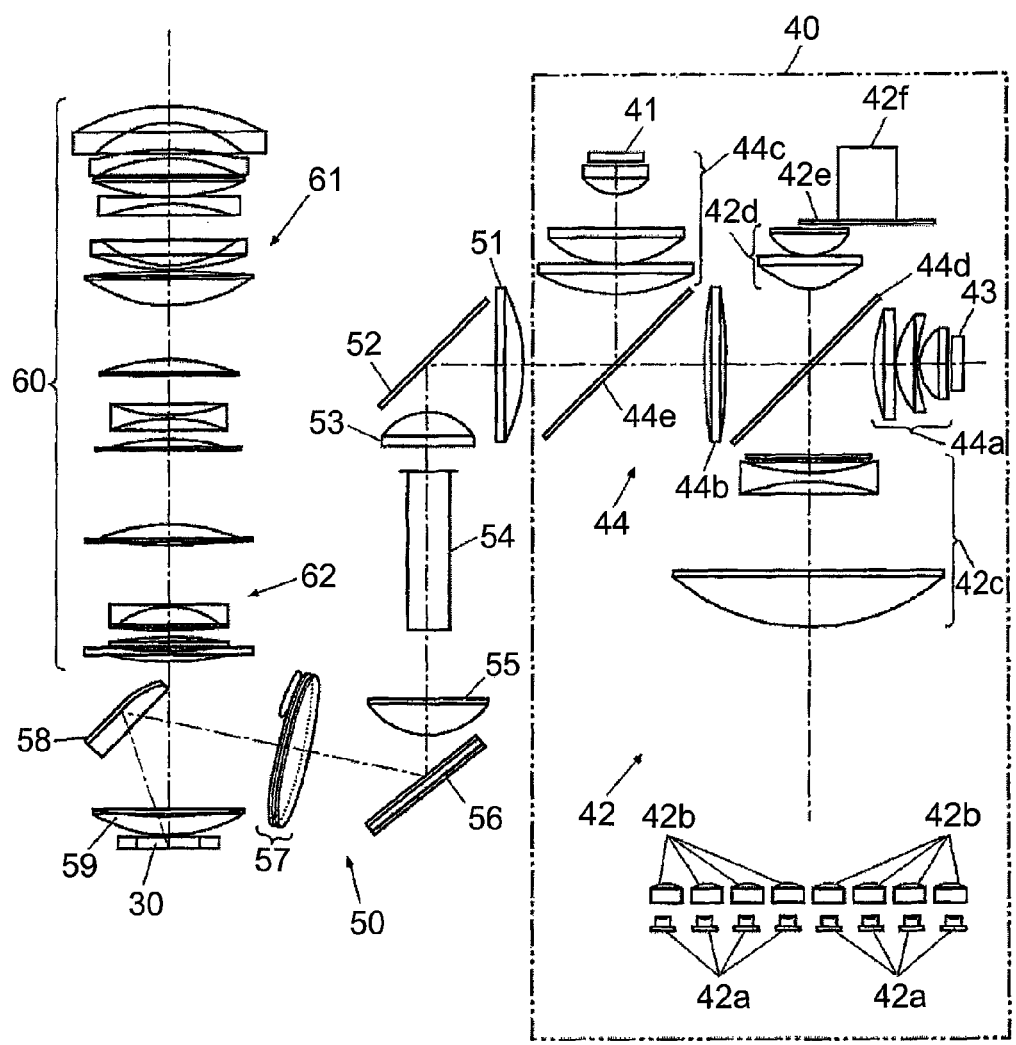
FIG. 13 is a plan view of the optical unit of a projector.

A projector including the light-emitting device 1 in any of the first to sixth embodiments is described with reference to FIG. 13. FIG. 13 is a plan view of the optical unit of the projector.

As shown in FIG. 13, the projector includes a display element 30, a time-division light generator 40, a light-source optical system 50 and a projection optical system 60.

The time-division light generator 40 emits red, green and blue lights on a time division basis. The time-division light generator 40 includes a first light source 41, a light source unit 42, a second light source 43 and an optical system 44.

The light source unit 42 generates green light. Specifically, the light source unit 42 emits excitation light and converts the excitation light into green light. The light source unit 42 includes a plurality of excitation light sources 42a, a plurality of collimator lenses 42b, a lens group 42c, a lens group 42d, a fluorescent wheel 42e and a spindle motor 42f.

The excitation light sources 42a are two-dimensionally arrayed. Each of the excitation light sources 42a is a laser diode to emit an excitation laser beam. The wavelength band of the excitation laser beam emitted from each excitation light source 42a is the blue light band or the ultraviolet band, but is not limited thereto. The time-division light generator 40 includes a driving device 10 for excitation light sources 42a. That is, the light-emitting element 2 corresponds to the excitation light sources 42a, which are driven to flash by the driving device 10.

The collimator lenses 42b are arranged opposite to the respective excitation light sources 42a, and the excitation laser beam emitted from each excitation light source 42a is collimated by the corresponding collimator lens 42b. The lens group 42c and the lens group 42d are disposed on the same optical axis. The lens group 42c and the lens group 42d bring a group of laser excitation beams collimated by the collimator lenses 42b together and condense the beams.

The fluorescent wheel 42e is disposed opposite to the face where the excitation light sources 42a are two-dimensionally arrayed. The lens group 42c and the lens group 42d are disposed between the fluorescent wheel 42e and the excitation light sources 42a. The optical axis of the lens group 42c and the lens group 42d lies at right angles to the fluorescent wheel 42e. The excitation laser beam condensed by the lens group 42c and the lens group 42d is emitted to the fluorescent wheel 42e. The fluorescent wheel 42e is composed of a green fluorescent body to emit green light by being excited by the excitation laser beam, and converts the excitation laser beam into green light. The fluorescent wheel 42e, which is connected to the spindle motor 42f, is rotated by the spindle motor 42f.

The first light source 41 is a red light-emitting diode to emit red light. The second light source 43 is a blue light-emitting diode to emit blue light. The time-division light generator 40 further includes a driving device 10 for the first light source 41 and a driving device 10 for the second light source 43. The period P1 of the driving device 10 for the first light source 41, that for the excitation light sources 42a and that for the second light source 43 are different from one another. Therefore, red, green and blue lights are generated on a time division basis (green light is caused by excitation light). When the period P1 of the driving device 10 for the first light source 41, that for the excitation light sources 42a and that for the second light source 43 occur one time in series in the period of one frame, for example, each of red, green and blue lights is emitted one time in series in the period of one frame. At least one of red, green and blue lights may be emitted multiple times in the period of one frame.

The first light source 41 is disposed such that the optical axis of the first light source 41 lies in parallel with the optical axis of the lens groups 42c and 42d. The second light source 43 is disposed such that the optical axis of the second light source 43 lies at right angles to the optical axis of the lens groups 42c and 42d and the optical axis of the first light source 41.

The optical system 44 causes the optical axis of red light emitted from the first light source 41, the optical axis of green light emitted from the light source unit 42 and the optical axis of blue light emitted from the second light source 43 to coincide with one another; and emits the red, green and blue lights. The optical system 44 includes a lens group 44a, a lens 44b, a lens group 44c, a first dichroic mirror 44d and a second dichroic mirror 44e.

The lens group 44a faces the second light source 43. The lens group 44a and the lens 44b are disposed such that the optical axis of the lens group 44a is in the same straight line as the optical axis of the lens 44b. The lens group 44a and the lens 44b are disposed such that the optical axis of the lens group 44a and the lens 44b lies at right angles to the optical axis of the lens group 42c and the lens group 42d between the lens group 42c and the lens group 42d.

The first dichroic mirror 44d is disposed between the lens group 44a and the lens 44b, and disposed between the lens group 42c and the lens group 42d. The first dichroic mirror 44d intersects with the optical axis of the lens groups 42c and 42d at a 45-degree angle, and intersects with the optical axis of the lens group 44a and the lens 44b at a 45-degree angle. The first dichroic mirror 44d transmits the excitation light in a predetermined wavelength band (blue excitation light, for example), which is emitted from the excitation light sources 42a, toward the fluorescent wheel 42e; and transmits the light in the blue wavelength band, which is emitted from the second light source 43, toward the second dichroic mirror 44e. The first dichroic mirror 44d reflects the light in a green wavelength band, which is emitted from the fluorescent wheel 42e, toward the second dichroic mirror 44e.

The lens group 44c faces the first light source 41. The lens group 44c is disposed such that the optical axis of the lens group 44c lies at right angles to the optical axis of the lens group 44a and the lens 44b on the opposite side of the second light source 43 and the first dichroic mirror 44d with respect to the lens 44b.

The second dichroic mirror 44e is disposed on the opposite side of the first light source 41 with respect to the lens group 44c, and disposed on the opposite side of the first dichroic mirror 44d with respect to the lens 44b. The second dichroic mirror 44e intersects with the optical axis of the lens group 44c at a 45-degree angle, and intersects with the optical axis of the lens group 44a and the lens 44b at a 45-degree angle. The second dichroic mirror 44e transmits the light in the blue and green wavelength bands, which is emitted from the first dichroic mirror 44d, toward the light-source optical system 50; and reflects the light in the red wavelength band, which is emitted from the first light source 41, toward the light-source optical system 50.

The structure of the time-division light generator 40 is not limited to the above-described structure, but any structure may be employed as long as the time-division light generator 40 emits red, green and blue lights on a time division basis.

For example, a green light-emitting diode may be provided at the place where the fluorescent wheel 42e and the optical axis of the lens group 42d intersect, and the green light-emitting diode may be controlled to flash by the driving device 10 in any of the above-described embodiments. In this case, the excitation light sources 42a, the lens group 42c, the fluorescent wheel 42e and the spindle motor 42f are omitted.

Alternatively, the fluorescent wheel 42e may include a green fluorescent body and a light-diffusing transmission section, and the green fluorescent body and the light-diffusing transmission section may alternately pass the optical axis of the lens group 42d with the rotation of the fluorescent wheel 42e. In this case, each of the excitation light sources 42a is a blue laser diode, and the second light source 43 is omitted. The blue light transmitted through the light-diffusing transmission section of the fluorescent wheel 42e is led to the lens group 44a from the direction similar to the optical system of the second light source 43 using a reflective optics (not shown). This causes the excitation light sources 42a and the first light source 41 to alternately emit light.

The light-source optical system 50 projects the red, green and blue lights emitted from the time-division light generator 40 onto the display element 30. The light-source optical system 50 includes a lens 51, a reflecting mirror 52, a lens 53, a light-guiding unit 54, a lens 55, an optical-axis converting mirror 56, a light condensing lens group 57, an irradiation mirror 58 and an irradiation lens 59.

The lens 51 is disposed on the opposite side of the lens 44b with respect to the second dichroic mirror 44e. The lens 51 is disposed such that the optical axis of the lens 51 coincides with the optical axis of the lens 44b and the lens group 44a.

The lens 53, the light-guiding unit 54 and the lens 55 are disposed such that their optical axes are in the same straight line. The optical axis of the lens 53, the light-guiding unit 54 and the lens 55 lies at right angles to the optical axis of the lens 51, the lens 44b and the lens group 44a.

The reflecting mirror 52 is provided at the place where the optical axis of the lens 53 and that of the lens 51 intersect. The reflecting mirror 52 intersects with the optical axis of the lens 51, 44b and lens group 44a at a 45-degree angle, and intersects with the optical axis of the lens 53, the light-guiding unit 54 and the lens 55 at a 45-degree angle. The red, green and blue lights, which are generated by the time-division light generator 40, are condensed by the lens 51 and the lens 53 and reflected by the reflecting mirror 52 toward the light-guiding unit 54.

The light-guiding unit 54 is a light tunnel or a lightrod. The light-guiding unit 54 reflects or totally reflects multiple times the red, green and blue lights, which are emitted from the time-division light generator 40, on the side surface of the light-guiding unit 54. This allows each of the red, green and blue lights to be a beam having a uniform intensity distribution. The lens 55 projects the red, green and blue lights, which are guided by the light-guiding unit 54, toward the optical-axis converting mirror 56 and condenses the light. The optical-axis converting mirror 56 reflects the red, green and blue lights, which are projected by the lens 55, toward the light condensing lens group 57. The light condensing lens group 57 projects the red, green and blue lights, which are reflected by the optical-axis converting mirror 56, toward the irradiation mirror 58 and condenses the light. The irradiation mirror 58 reflects the light, which is projected by the light condensing lens group 57, toward the irradiation lens 59. The irradiation lens 59 projects the light, which is reflected by the irradiation mirror 58, toward the display element 30.

The display element 30, which is a spatial light modulator, forms an image by modulating the red, green and blue lights emitted by the light-source optical system 50 for each pixel (for each spatial light modulation element). Specifically, the display element 30 is a digital micromirror device (DMD) having a plurality of movable micromirrors which are two-dimensionally arrayed, and the movable micromirrors correspond to the respective spatial light modulation elements as pixels. The display element 30 is driven by a driver. Specifically, when red light is emitted to the display element 30, the ratio of time (duty cycle) during which the red light is reflected toward the later-described projection optical system 60 is controlled for each movable micromirror by controlling each movable micromirror of the display element 30 (PWM control, for example). Thus, a red image is formed by the display element 30. The same applies to the case where green light or blue light is emitted to the display element 30.

The display element 30 may be a transmissive spatial light modulator (such as a panel having liquid crystal shutter array, i.e., so-called liquid crystal display), instead of a reflective spatial light modulator. In the case where the display element 30 is a transmissive spatial light modulator, the optical design of the light-source optical system 50 is changed such that the optical axis of the red, green and blue lights emitted by the light-source optical system 50 coincides with the optical axis of the later-described projection optical system 60, and the display element 30 is disposed between the projection optical system 60 and the light-source optical system 50.

The projection optical system 60 faces the display element 30, with the optical axis of the projection optical system 60 extending in the front-back direction to intersect the display element 30 (specifically, the optical axis of the projection optical system 60 lies at right angles to the display element 30). The projection optical system 60 projects forward the light reflected by the display element 30 to project an image formed by the display element 30 onto a screen. The projection optical system 60 includes a movable lens group 61 and a fixed lens group 62 and the like. The projection optical system 60 can change the focal length and can perform focusing by moving the movable lens group 61.

The optical system of the projector shown in FIG. 13 may be applied to a rear-projection display.

The present invention should not be interpreted to be limited to the above-described embodiments and the modifications. It should naturally be understood that modifications or improvements may appropriately be made without changing the substantial parts of the present invention. The scope of the present invention is not limited to the above-described embodiments and modifications but limited only by the appended claims and their equivalents.

The entire disclosure of Japanese Patent Applications No. 2012-206839 filed on Sep. 20, 2012 and No. 2013-060176 filed on Mar. 22, 2013 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. A driving device comprising:
a switching power supply circuit including an inductor, the switching power supply circuit repeatedly turning on and off an input current flowing through the inductor to repeatedly accumulate and release energy in and from the inductor so as to convert input power to output power;
a first switching element connected to a load, the first switching element opening and closing a circuit of the load;
an output capacitor connected in parallel to the load and the first switching element;
a selection switch disposed between the inductor and the output capacitor, the selection switch switching between a first selection state and a second selection state, the first selection state being a state where the load is electrically connected to the inductor and where a reference potential portion is electrically disconnected from the inductor, and the second selection state being a state where the load is electrically disconnected from the inductor and where the reference potential portion is electrically connected to the inductor;
a timing controller which alternately opens and closes the first switching element and alternately operates the switching power supply circuit by repeatedly turning on and off the input current flowing through the inductor and stops operating the switching power supply circuit, the timing controller operating the switching power supply circuit while the first switching element is closed; and
a controller which alternately switches the selection switch between the first selection state and the second selection state, wherein
the controller puts the selection switch into the second selection state before the timing controller closes the first switching element.

2. The driving device according to claim 1, wherein the controller switches the selection switch from the second selection state to the first selection state at a time when the timing controller closes the first switching element.

3. The driving device according to claim 1, wherein the controller switches the selection switch from the second selection state to the first selection state at a time when the timing controller starts operating the switching power supply circuit.

4. The driving device according to claim 1, wherein
the switching power supply circuit performs a constant-current control so as to maintain an output current of the switching power supply circuit at a predetermined target value; and
a length of a period during which the selection switch is in the second selection state is determined on the basis of the predetermined target value, an inductance of the inductor and an input voltage of the switching power supply circuit.

5. The driving device according to claim 1, wherein the controller detects a current of the inductor and an input voltage at a time when the timing controller opens the first switching element, and the controller controls the selection switch to be in the second selection state during a period determined on the basis of a detected value of the input voltage, a detected value of the current of the inductor and the inductance of the inductor.

6. The driving device according to claim 1, wherein
the selection switch includes:
  a second switching element disposed between the inductor and the reference potential portion, and
  a rectifier element having an anode connected to the second switching element and a cathode connected to the load; and
the controller puts the selection switch into the second selection state by turning on the second switching element, and puts the selection switch into the first selection state by turning off the second switching element.

7. The driving device according to claim 6, wherein
the switching power supply circuit is a boost switching regulator; and
the switching power supply circuit converts the input power to the output power by repeatedly turning on and off the second switching element in preference to the turning off of the second switching element by the controller while the first switching element is closed.

8. The driving device according to claim 1, wherein
the selection switch includes:
  a second switching element disposed between the inductor and the reference potential portion, and
  a third switching element disposed between the second switching element and the load, the third switching element being off while the second switching element is on, and the third switching element being on while the second switching element is off; and
the controller puts the selection switch into the second selection state by turning on the second switching element and turning off the third switching element, and puts the selection switch into the first selection state by turning off the second switching element and turning on the third switching element.

9. The driving device according to claim 1, wherein
the switching power supply circuit is a buck switching regulator; and
the switching power supply circuit includes:
  a chopper switching element disposed between an input and the inductor, and
  a flywheel diode having an anode connected to the reference potential portion and a cathode connected to the inductor.

10. The driving device according to claim 9, wherein the controller turns on the chopper switching element at a time when the controller puts the selection switch into the second selection state.

11. The driving device according to claim 1, wherein
the switching power supply circuit is a boost switching regulator;
the switching power supply circuit includes a chopper switching element and a flywheel diode;
the selection switch is connected to the inductor through the flywheel diode;
the inductor is connected to an input;
the chopper switching element is disposed between the inductor and the reference potential portion; and
an anode of the flywheel diode is connected to the inductor and a cathode of the flywheel diode is connected to the selection switch.

12. The driving device according to claim 1, wherein the timing controller stops operating the switching power supply circuit at a time when the timing controller opens the first switching element.

13. The driving device according to claim 1, wherein the timing controller stops operating the switching power supply circuit after the timing controller opens the first switching element.

14. A driving device comprising:
a first switching element connected to a load, the first switching element opening and closing a circuit of the load;
an output capacitor connected in parallel to the load and the first switching element;
a boost switching power supply circuit including an inductor connected to an input, a rectifier element having an anode connected to the inductor and a cathode connected to the output capacitor, and a second switching element disposed between the inductor and a reference potential portion, the boost switching power supply circuit repeatedly turning on and off the second switching element to repeatedly turn on and off an input current flowing through the inductor and to repeatedly accumulate and release energy in and from the inductor so as to convert input power to output power;
a timing controller which alternately opens and closes the first switching element and alternately operates the boost switching power supply circuit by repeatedly turning on and off the second switching element and stops operating the boost switching power supply circuit, the timing controller operating the boost switching power supply circuit while the first switching element is closed; and
a controller which alternately turns on and off the second switching element, wherein
the boost switching power supply circuit repeatedly turns on and off the second switching element in preference to the turning off of the second switching element by the controller while the controller controls the second switching element to be off; and
the controller turns on the second switching element before the timing controller closes the first switching element.

15. A light-emitting device comprising:
the driving device according to claim 1; and
a light-emitting element as the load.

16. A projector comprising:
the light-emitting device according to claim 15.

17. A light-emitting device comprising:
the driving device according to claim 14; and
a light-emitting element as the load.

18. A projector comprising:
the light-emitting device according to claim 17.

* * * * *